US012417637B2

(12) United States Patent
Sommer et al.

(10) Patent No.: US 12,417,637 B2
(45) Date of Patent: Sep. 16, 2025

(54) AUTOMATICALLY GENERATING BEST DIGITAL IMAGES OF A PERSON IN A PHYSICAL ENVIRONMENT

(71) Applicant: TARGET BRANDS, INC., Minneapolis, MN (US)

(72) Inventors: Ethan Sommer, Minneapolis, MN (US); Christopher Brakob, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 334 days.

(21) Appl. No.: 18/303,354

(22) Filed: Apr. 19, 2023

(65) Prior Publication Data

US 2023/0419674 A1 Dec. 28, 2023

Related U.S. Application Data

(60) Provisional application No. 63/356,371, filed on Jun. 28, 2022.

(51) Int. Cl.
*G06V 20/52* (2022.01)
*G06V 10/26* (2022.01)
*G06V 10/77* (2022.01)
*G06V 10/774* (2022.01)
*G06V 10/776* (2022.01)
*G06V 10/94* (2022.01)
*G06V 40/16* (2022.01)
*G06V 40/20* (2022.01)

(52) U.S. Cl.
CPC .............. *G06V 20/52* (2022.01); *G06V 10/26* (2022.01); *G06V 10/7715* (2022.01); *G06V 10/774* (2022.01); *G06V 10/776* (2022.01); *G06V 10/95* (2022.01); *G06V 40/171* (2022.01); *G06V 40/20* (2022.01)

(58) Field of Classification Search
CPC .. G06V 20/52; G06V 40/171; G06V 10/7715; G06V 10/95; G06V 10/26; G06V 40/20; G06V 10/774; G06V 10/776
See application file for complete search history.

(56) References Cited

U.S. PATENT DOCUMENTS

| 8,139,817 B2 | 3/2012 | Laganiere et al. |
| 9,195,883 B2 | 11/2015 | Brewer et al. |
| 11,042,725 B2 | 6/2021 | Rodriguez et al. |

(Continued)

*Primary Examiner* — Qun Shen
(74) *Attorney, Agent, or Firm* — Barnes & Thornburg LLP

(57) ABSTRACT

The disclosed technology provides for generating best images of a person in a retail environment. A method may include receiving, by an edge computing device from a camera, a continuous stream of image data of the retail environment, detecting, using object detection techniques, a person in the image data, the image data including a group of images that are part of a time series, generating bounding boxes for each of the group of images around the person based on detecting the person as they move in the images, identifying, based on applying a features model to each bounding box, at least one feature of the group of images depicting the person, selecting a subset of the bounding boxes having at least one feature that satisfies best images criteria, the subset having best images of the person, and returning the best images of the person.

20 Claims, 13 Drawing Sheets

(56) References Cited

U.S. PATENT DOCUMENTS

| | | | |
|---|---|---|---|
| 2008/0193010 A1* | 8/2008 | Eaton | G06V 20/52 |
| | | | 382/159 |
| 2012/0099765 A1* | 4/2012 | Zheng | G06T 7/248 |
| | | | 382/103 |
| 2015/0249807 A1* | 9/2015 | Naylor | G08B 13/19682 |
| | | | 348/155 |
| 2018/0349707 A1* | 12/2018 | Bataller | G06T 7/0002 |
| 2019/0103026 A1* | 4/2019 | Liu | G06V 10/25 |
| 2019/0347806 A1* | 11/2019 | Vajapey | G06T 7/20 |
| 2020/0300538 A1* | 9/2020 | Avakian | G06Q 30/0251 |
| 2021/0166003 A1 | 6/2021 | Chen et al. | |
| 2021/0319420 A1* | 10/2021 | Yu | G06V 20/52 |
| 2021/0374430 A1* | 12/2021 | Siemer | G06V 40/103 |
| 2023/0230257 A1* | 7/2023 | Fay | G06T 7/60 |
| | | | 382/103 |

\* cited by examiner

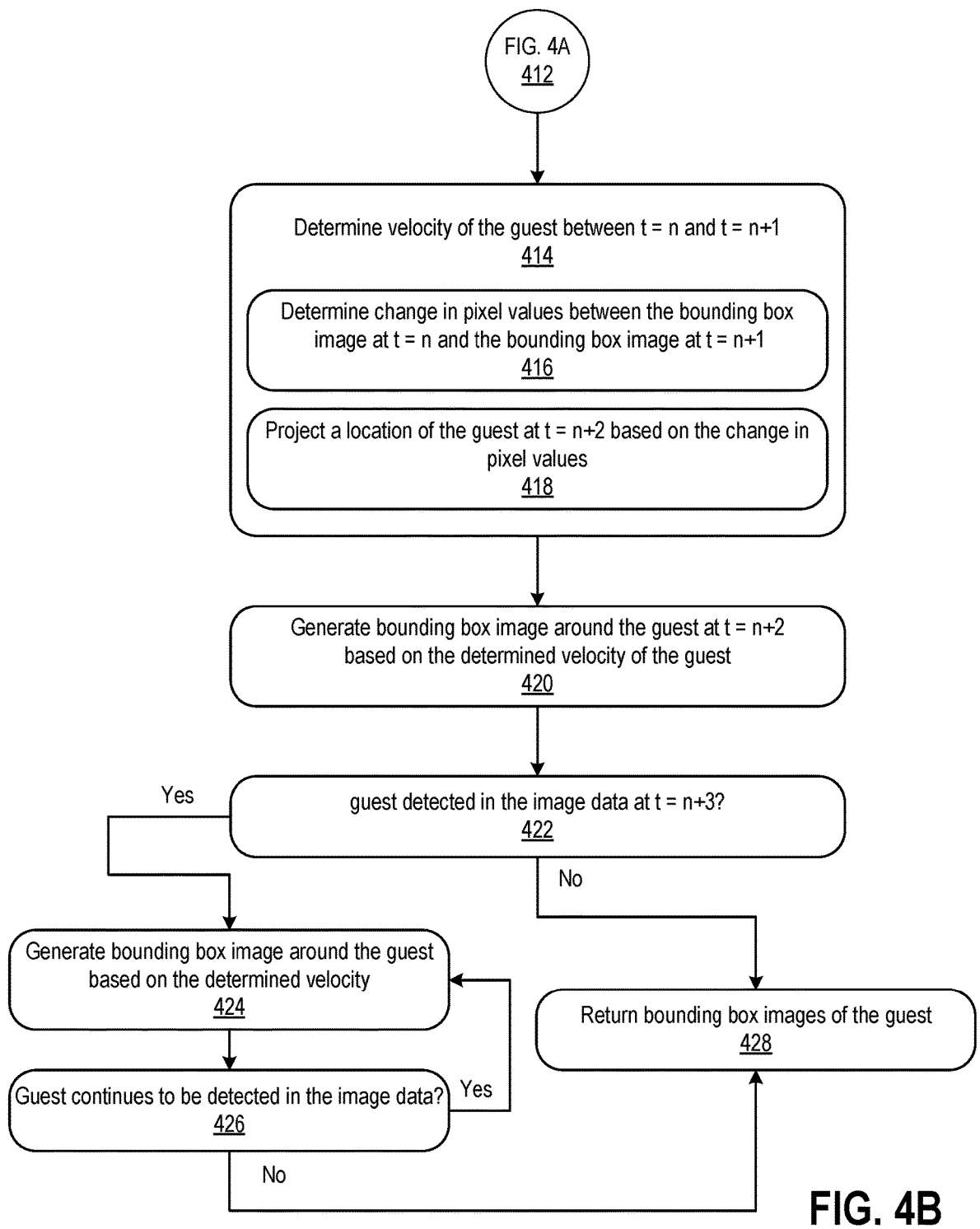

AUTOMATICALLY GENERATING BEST DIGITAL IMAGES OF A PERSON IN A PHYSICAL ENVIRONMENT

INCORPORATION BY REFERENCE

This application claims priority to U.S. Provisional Application Ser. No. 63/356,371, filed on Jun. 28, 2022, the disclosure of which is incorporated by reference in its entirety.

TECHNICAL FIELD

This document generally describes devices, systems, and methods related to automatically generating and selecting a set of best digital images that objectively represent a person as they move in a physical environment from a stream of digital activity data, such as digital video or other digital image data.

BACKGROUND

Retail environments, such as stores, can provide many different types of items to be purchased by guests, such as shoppers and/or customers. Some retail environments can sell clothes, food, electronics, equipment, etc. Some retail environments can sell a combination of different types of items. Some retail environments can be small in size such that in-store employees can more easily see guests as they move throughout such retail environments. Other retail environments can be so large in size that in-store employees may not be able to see all guests as they move throughout such retail environments. The in-store employees may not be able to keep track of how many guests enter and exit a retail environment, how long guests spend in different areas of the retail environment, where the guests go in the retail environment, which items are most frequented by guests, which items are least frequented by guests, and whether gusts shoplift one or more items or engage in other risky or suspicious activity in the retail environment.

Some guests can enter a retail environment with the intention of purchasing items. Typically, guests enter a store, collect items they wish to purchase, and then proceed to a checkout lane to purchase the items they collected. Occasionally guests may intentionally or unintentionally leave a store without paying for some items, though. For example, some guests may forget about items that are located underneath other items, such as items located in the bottom of a shopping cart, and may leave the store without processing those items as part of a checkout process. In other instances, guests may intentionally leave a store without paying for items, and may take measures to hide their activity, such as concealing items inside of a bag or clothing, or potentially swapping barcodes with other items of lower value so that that the guest goes through the checkout process, but pays for the lower value item identified by the barcode even though they are leaving with the higher value physical item. Leaving a store without paying for the full value of the item may be considered shoplifting or stealing, and may be considered a shortage with regard to inventory levels in the retail environment.

Sometimes, a retail environment can employ a security camera system. The security camera system can capture footage, such as images and videos, of different areas or locations in the retail environment. This footage can be reviewed by an in-store employee to determine whether a guest appearing in the footage stole items or engaged in other suspicious activity. The in-store employee can view the raw footage as it is captured. In other words, the in-store employee can be required to look at multiple camera feeds at a time and switch between views from the different camera feeds to view activity of guests in the retail environment. Sometimes, the in-store employee may not be able to make an association between one camera feed and another or multiple camera feeds. The in-store employee may also miss footage of a guest engaging in some form of activity that poses a security threat to the store, its employees, or other guests in the retail environment, such as theft, assault, or battery.

SUMMARY

The document generally describes technology to generating and selecting best digital images of a person, such as a guest in a retail environment or store, from a digital image data stream (e.g., video feed from a security camera) as they move throughout a physical environment or physical space. The disclosed technology includes techniques for more efficiently generating best digital images of people in the physical environment, which can permit for the generation of these images to be pushed to edge computing devices that leverage low computational resources (e.g., low powered processors, small amount of RAM). For example, the disclosed technology uses more efficient processes to procure best digital images of a person across multiple different digital images, such as individual frames from a digital video stream. The disclosed technology also performs more efficient image quality scoring techniques that can be used to more quickly and efficiently assess and compare the multiple different digital images to each other. These techniques can provide accurate and reliable best digital image generation results while using minimal computational resources, which is in contrast to other image analysis and comparison techniques that may require much larger and/or more significant computational operations and resources.

The best digital images can be used, by an in-store employee, to objectively and accurately isolate a guest across a continuous video stream, where that guest may be associated with a shortage or other risky or suspicious activity in the retail environment. For example, the disclosed technology provides for reliably differentiating features of the guest in a constant stream of image data (e.g., a sequence of frames from a video feed) using object detection techniques and selecting one or more best images of the guest from the stream of image data. Object detection techniques can be used to generate bounding boxes around the guest's head as the guest moves in the image data (e.g., the guest walks towards an exit of the retail environment and as the guest approaches the exit, their head may appear larger in the image data). Machine learning techniques may be used to score various features identified in each image (e.g., the bounding boxes of the guest's head), such as lighting, prominence of certain facial features, image clarity, etc. The scores, which can also be confidence values, can be compared against each other and one or more threshold values to determine a set of best images of the guest. Multiple images may be selected, in some implementations, to show different portions of a guest's face in better clarity. For example, a first best image can show the guest's eyes but not their chin, while a second best image can show the guest's chin in the best lighting and/or angle.

One or more embodiments described herein can include a system for generating best images of a person in a retail environment, the system including: a camera positioned within a retail environment, the camera having at least one image sensor that can generate a continuous stream of image data of the retail environment and an edge computing device in communication with the camera. The edge computing device can: receive, from the camera, the continuous stream of image data, detect, using object detection techniques, a person in the continuous stream of image data, the continuous stream of image data including a group of images that may be part of a time series, generate bounding boxes for each of the group of images around the person based on detecting the person as the person moves in the continuous stream of image data, identify, based on applying a features model to each of the bounding boxes, at least one feature of the group of images depicting the person, the features model having been trained to identify and score features in training image data, the training image data including at least one of facial features of a person and quality features of the training image data, select a subset of the bounding boxes having at least one of the at least one features that satisfies best images criteria, the subset of the bounding box images being best images of the person, and return the best images of the person.

In some implementations, the embodiments described herein can optionally include one or more of the following features. For example, the edge computing device can be firmware installed on the camera. The camera can also include the edge computing device. The edge computing device can also cache and down-sample the continuous stream of image data, and detect the person in the down-sampled continuous stream of image data. The edge computing device can also, in response to selecting the subset of the bounding boxes having at least one of the at least one features that satisfies the best images criteria, retrieve a portion of the cached image data that corresponds to at least one of the best images of the person, and return the retrieved portion of the cached image data to be presented in a graphical user interface (GUI) display at a computing device of a relevant stakeholder of the retail environment, the relevant stakeholder being at least one of an in-store employee, safety and security personnel, and law enforcement. The cached image data can include a high resolution version of at least a portion of the continuous stream of image data.

As another example, the edge computing device can detect the person in the continuous stream of image data using an object detection model that was trained to (i) identify, using object detection techniques, features of the person in training image data, and (ii) score the identified features of the person using scoring criteria. In some implementations, detecting the person in the continuous stream of image data can include: generating a bounding box around the person in a first image of the group of images in the continuous stream of image data and tracking the bounding box across subsequent images in the group of images in the continuous stream of image data. Tracking the bounding box across subsequent images in the group of images in the continuous stream of image data can include: generating a first bounding box around the person at a first time in the first image of the group of images, generating a second bounding box around the person at a second time in a second image of the group of images, determining a change in pixel values between the first bounding box and the second bounding box, determining a velocity of the person based on the change in pixel values, the velocity indicating a change in movement and directionality of the person between the first image and the second image in the group of images, projecting a location of the person in a third image of the group of images at a third time based on the determined velocity of the person, and generating a third bounding box around the person at the third time in the third image at the projected location of the person. As another example, detecting the person in the continuous stream of image data can include applying a model to the continuous stream of image data, the model having been trained to (i) determine a velocity of the person across the group of images in the continuous stream of image data and (ii) project movement of the person across the group of images in the continuous stream of image data based on the determined velocity.

As another example, the at least one feature of the group of images depicting the person can include at least one of a forehead, eyes, nose, mouth, chin, cheeks, face, posture, hair, clothing, accessories, and movement of the person. The at least one feature of the group of images depicting the person may include at least one of lighting, clarity, sharpness, shadows, angle, and camera viewpoint. Selecting a subset of the bounding boxes having at least one of the at least one feature that satisfies best images criteria can include selecting at least one of the bounding boxes having at least one feature score corresponding to the at least one feature that satisfies a threshold feature score value. Returning the best images of the person may include storing, in a data store, at least one high resolution image of the person that corresponds to at least one of the best images of the person. Returning the best images of the guest further may include transmitting the at least one high resolution image of the person to a computing device of a relevant stakeholder of the retail environment for presentation in a GUI display of the computing device.

In some implementations, returning the best images of the person may include storing, in a data store, a low resolution version of at least a portion of the continuous stream of image data that corresponds to at least one of the best images of the person. Returning the best images of the person further can include transmitting the low resolution version of the portion of the continuous stream of image data for presentation in a GUI display of a computing device of a relevant stakeholder of the retail environment. Sometimes, returning the best images of the person can include transmitting, for presentation in a GUI display of a computing device of a relevant stakeholder of the retail environment, (i) at least one high resolution version of at least one best image of the person and (ii) a low resolution version of at least a portion of the continuous stream of image data that corresponds to at least one of the best images of the person. Returning the best images of the person can include annotating the best images with information indicating the best images criteria that was satisfied. The information can include an indication of a type of feature identified in each of the best images and a feature score corresponding to the identified feature in each of the best images.

In some implementations, the edge computing device may also associate the person in the best images with an event in the retail environment. The event may be at least one of a safety event and a security event. Associating the person in the best images with an event in the retail environment can include: receiving event data from at least one sensing device in the retail environment, the event data including a timestamp associated with the event, determining that the timestamp associated with the best images of the person is within a threshold amount of time of the timestamp in the event data, and associating, based on the determining step, the person in the best images with the event corresponding to the event data. Associating the person in the best images with the event in the retail environment further can include generating a confidence value indicating a likelihood that the person is associated with the event. The event data may include at least one of transaction data generated by a point of sale (POS) terminal during a checkout process, checkout data generated by a checkout system during a checkout process, and image data generated by at least one camera in the retail environment. Associating the person in the best images with an event in the retail environment can include identifying a pathway of the person through the retail environment based on correlating the best images of the person with event data in the retail environment, the event data including at least one of (i) images of the person in the retail environment and (ii) timestamps at which activities occurred in the retail environment. Associating the person in the best images with an event in the retail environment can include identifying similar features of the person in (i) the best images and (ii) image data received from cameras positioned throughout the retail environment.

As another example, selecting a subset of the bounding boxes having at least one of the at least one feature that satisfies best images criteria may include: aggregating, for each of the bounding boxes, scores for each of the features identified in the bounding box to generate an aggregate feature score, determining whether the aggregate feature score satisfies a threshold score value, and adding the bounding box to the subset based on a determination that the aggregate feature score satisfies the threshold score value. As another example, selecting a subset of the bounding boxes having at least one of the at least one features that satisfies best images criteria can include: retrieving, for each of the identified features in each of the bounding boxes, a respective threshold score value, determining whether a score of the identified feature satisfies the respective threshold score value, generating a count indicating a quantity of the identified features that satisfy the respective threshold score values, determining whether the count exceeds a threshold features count, and adding the bounding box to the subset based on a determination that the count exceeds the threshold features count.

In some implementations, the system may also include a checkout system in communication with the edge computing device, the checkout system being able to generate event data during a checkout process at the checkout system and transmit the event data to the edge computing device, and the edge computing device being able to associate the person in the best images with an event corresponding to the event data. The edge computing device can be part of the checkout system. The edge computing device can be firmware installed on the checkout system.

As another example, the camera can include a housing and the edge computing device may be physically contained within the housing. The camera can be positioned near an exit area of the retail environment. The camera can also be positioned near a checkout area of the retail environment. In some implementations, returning the best images of the person can include transmitting the best images of the person to a computing device or an in-store employee of the retail environment for presentation in a graphical user interface (GUI) display at the computing device.

One or more embodiments described herein may include a method for generating best images of a person in a retail environment, the method including: receiving, by an edge computing device and from a camera, a continuous stream of image data of a retail environment, detecting, by the edge computing device and using object detection techniques, a person in the continuous stream of image data, the continuous stream of image data including a group of images that are part of a time series, generating, by the edge computing device, bounding boxes for each of the group of images around the person based on detecting the person as the person moves in the continuous stream of image data, identifying, by the edge computing device and based on applying a features model to each of the bounding boxes, at least one feature of the group of images depicting the person, the features model having been trained to identify and score features in training image data, the training image data including at least one of facial features of a person and quality features of the training image data, selecting, by the edge computing device, a subset of the bounding boxes having at least one of the at least one features that satisfies best images criteria, the subset of the bounding box images being best images of the person, and returning, by the edge computing device, the best images of the person.

The method can optionally include one or more of the abovementioned features.

The devices, system, and techniques described herein may provide one or more of the following advantages. For example, the disclosed technology provides for computationally efficient objective tracking and detection of a guest's facial features. Using object detection and machine learning techniques, images that best represent various facial features of the guest can be selected and provided to an in-store employee using low computational resources and processing power on the edge. The disclosed technology does not require identifying or tracking the particular guest across the image data, thereby saving computational resources and providing more efficient and accurate image analysis. Low processing power object detection techniques can, for example, be used to track the guest's eyes in a continuous stream of image data in order to establish continuity of the guest across the image data and objectively isolate the guest's eyes. The in-store employee can then use these best images to objectively associate the guest with potential shortages, security events, or suspicious activity in the retail environment. The disclosed technology can limit or otherwise prevent the in-store employee from using personal bias or subjectivity in association of a guest with activity in the retail environment.

As another example, the disclosed technology can be performed at the edge in the retail environment. For example, the disclosed technology can be deployed as firmware installed on cameras in the retail environment, such as a remote or surveillance (CCTV) camera near an exit of the retail environment, near a checkout area of the retail environment, or other locations within the retail environment. Since the disclosed technology can be deployed on the edge, fewer computational resources and processing power may be used to quickly and efficiently generate and select best digital images of people in the retail environment in real-time and/or near real-time. As an illustrative example, the disclosed technology can be deployed at an 8 MP camera that may not have sufficient disk or storage space to efficiently and accurately store and process high resolution images. The camera can generate a vast amount of data. High resolution images generated by the camera can, for example, be cached and down-sampled for processing. The down-sampled, or low resolution, images can be processed at the edge, which uses less compute resources, processing power, and CPU cycles to generate and select the best images. The best images, or a subset or portion thereof, can then be transmitted in high resolution to a cloud or computing system for additional processing and/or storage. Those high resolution images can be used by an in-store employee or other relevant stakeholder to associate the guest with security events or suspicious activity in the retail environment.

Similarly, the in-store employee can receive and use a few high resolution best images of the guest from the camera(s) to quickly and accurately associate the guest with activity (e.g., suspicious activity, security events) in the retail environment. Therefore, the in-store employee may not have to sift through a continuous stream of low resolution image data captured by the camera(s) to make the association(s). The in-store employee can accurately, quickly, and objectively associate the guest with the activity using the disclosed technology.

Moreover, the object tracking techniques described herein can be a low cost approach to generate and select images that clearly depict various features of guests in the retail environment. The object tracking techniques are in part low cost because they use less compute resources and processing power than other techniques to track an object across a continuous stream of low resolution image data. Because the object tracking techniques are low cost, these techniques can be efficiently deployed on the edge to accurately generate and select best images of a guest before and/or within a threshold period of time that they leave the retail environment.

As another example, existing technology in the retail environment, such as cameras, can be leveraged to perform the disclosed techniques. The disclosed technology can be deployed as firmware installed at cameras already in the retail environment, thereby providing a cost-effective and cost-efficient solution to assist relevant stakeholders in addressing and mitigating shortage events and other activity in the retail environment.

The details of one or more implementations are set forth in the accompanying drawings and the description below. Other features and advantages will be apparent from the description and drawings, and from the claims.

BRIEF DESCRIPTION OF THE DRAWINGS

FIGS. 4A-B is a flowchart of a process for generating bounding box images around a guest as they move in a retail environment.

Like reference symbols in the various drawings indicate like elements.

DETAILED DESCRIPTION OF ILLUSTRATIVE EMBODIMENTS

This document generally relates to technology for processing, generating, and selecting best images of a person, such as a guest, as they move throughout a physical environment, such as a retail environment or store. The disclosed techniques can be performed on the edge in the physical environment to quickly and efficiently select best digital images of the person in real-time or near real-time. The disclosed techniques can utilize less computational resources, processing power, and network bandwidth in order to accurately process, generate, and select the best digital images of the person, which can be used by relevant stakeholders to respond to, prevent, or otherwise detect suspicious activity in the retail environment.

As described further below, image data can be captured by cameras in the retail environment, such as in aisles, around a checkout area, and/or at an exit of the retail environment. A continuous stream of digital image data, such as a sequence of frames in a video feed of the guest exiting the retail environment, can be analyzed at the edge (e.g., at a camera near the exit) using object detection and machine learning techniques to select at least one best image of the guest. Machine learning techniques, for example, can be used to score prominence and/or clarity of one or more facial features and/or image features in the image data of the continuous stream. One or more images having highest scores (e.g., confidence values) per facial features, other image features, or combinations thereof, can be selected as the best image(s) of the guest. In some implementations, the best images may also be stitched together to determine a best image of the guest that shows the guest's facial features with most clarity. For example, one image can clearly represent the guest's mouth and chin while another image can clearly represent the guest's eyes and eyebrows. Both these images can be stitched together and provided to an in-store employee or other relevant stakeholder to be used in objectively associating the guest with security events or other activities in the retail environment.

Figure 1:
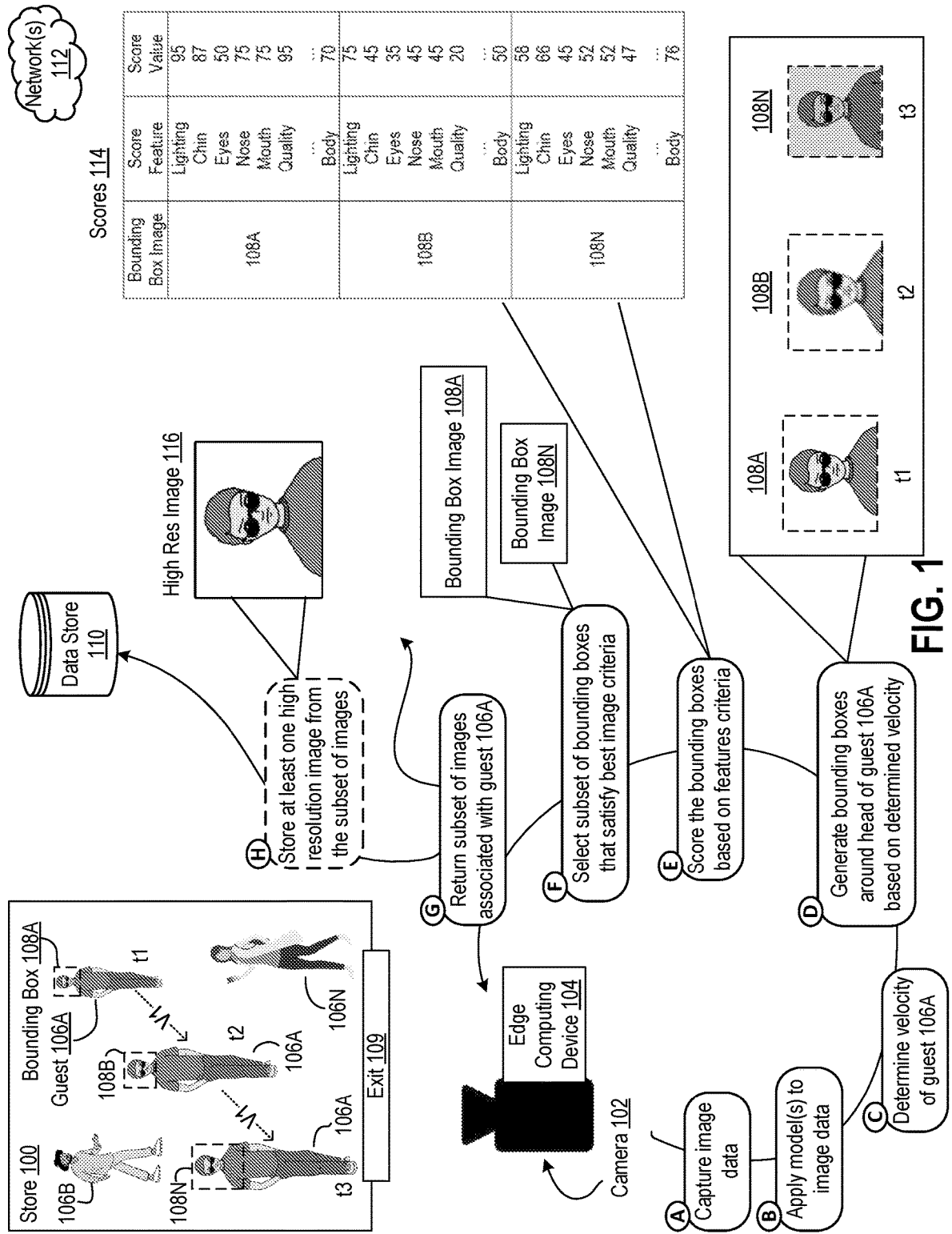
FIG. 1 is a conceptual diagram for generating and selecting best images of guests in a retail environment using object detection techniques.

Referring to the figures, FIG. 1 is a conceptual diagram for generating and selecting best images of guests in a retail environment using object detection techniques. The retail environment can be a physical store 100, such as a clothing store, grocery store, or other type of shopping environment. A camera 102 can be positioned at or near an exit 109 of the store 100. The camera 102 can also be located in various other areas in the store 100, including but not limited to near checkout lanes, self-checkout systems, aisles, and/or shelves. Moreover, the store 100 can include additional cameras 102. For example, cameras already installed in the store 100, such as surveillance cameras, can be positioned in various locations throughout the store 100 and used to perform the disclosed technology. Any type of camera 102 can be used in the store 100, such as low resolution cameras, high resolution cameras, surveillance cameras, CCTV cameras, or any other cameras installed in the store 100.

The camera 102 can include an edge computing device 104. In some implementations, the edge computing device 104 can be part of the camera 102. For example, the edge computing device 104 can be a processor of the camera 102. In some implementations, the edge computing device 104 can be software, firmware, processor, or other edge systems/devices deployed at or installed on the camera 102. In some implementations, the edge computing device 102 can be separate from the camera 102. The disclosed technology can be performed at the edge computing device 104, as described herein, to provide efficient and low cost processing of image data generated by the camera 102.

The camera 102 and/or the edge computing device 104 can also communicate with a data store 110 via network(s) 112. The data store 110 can be any type of storage (e.g., database, cloud store) used for storing best images of guests in the store 100. For example, the camera 102 can capture high resolution images. The high resolution images can be down-sampled and cached by the edge computing device 104. The down-sampled, low resolution images can be processed at the edge computing device 104 to generate and select at least one best image of a guest. The edge computing device 104 can then select high resolution versions of the best image(s) in cache and transmit those high resolution best images to the data store 110 and/or to a computing device of a relevant stakeholder in the store 100 (e.g., an in-store employee, safety and security personnel, etc.). Low resolution versions of the images can therefore be processed quickly and efficiently on the edge while high resolution versions of the best images can be transmitted from the edge to one or more other systems for use (e.g., by relevant stakeholders such as in-store employees) in objectively associating the guest with activity in the store 100.

In FIG. 1, guests 106A, 106B, and 106N are in the store 100 near the exit 109. The camera 102 can capture a continuous stream of image data (e.g., a video feed) of the area near the exit 109. One or more of the guests 106A-N may appear in the image data. In the example of FIG. 1, the disclosed technology is used to generate and select best images of the guest 106A as they approach the exit 109 of the store 100.

The camera 102 can capture digital image data in block A. As described herein, the camera 102 can capture a continuous stream of image data, such as a video feed. In some implementations, the camera 102 can capture image data at a video speed of 30 frames per second. The camera 102 can also capture image data at one or more other sample rates. For example, the image data can be captured at sample rates including but not limited to 5 frames/second, 10 frames/second, 15 frames/second, 20 frames/second, 25 frames/second, 50 frames/second, 60 frames/second, etc. The camera 102 can capture image data of an area surrounding or near the exit 109 of the store 100. The image data can include one or more of the guests 106A-N as they appear in a field of view of the camera 102. As mentioned above, the image data can be high resolution images of what appears in the camera's field of view. The image data captured by the camera 102 can be transmitted to the edge computing device 104, which can cache the high resolution images and down-sample the images to be used in processing on the edge.

In block B, the edge computing device 104 can apply one or more object detection models to the image data. As described in reference to FIG. 2, the model(s) can be trained to isolate a particular guest's head from a background and/or other guests in the image data using object detection techniques. Using the model(s), the edge computing device 104 can then generate a bounding box around the particular guest's head and track the bounding box across the continuous stream of image data to generate and select best images of the particular guest.

For example, in block C, the edge computing device 104 can determine a velocity V1 of guest 106A. The edge computing device 104 can apply the model(s) to the image data to generate bounding box 108A around the guest 106A's head when they first appear in the image data, at time=t1. The edge computing device 104 can also generate bounding box 108B around the guest 106A's head at time=t2 in the image data, as the guest 106A approaches the exit 109 (and therefore gets closer to the camera 102). The edge computing device 104 can determine a quantity of pixels that the guest 106A's head moves between the image data captured at t1 and the image data captured at t2. The edge computing device 104 can then calculate the expected velocity V1 of the guest 106A based on the determined quantity of pixels. The edge computing device 104 can use the expected velocity V1 to project where next the guest 106A will appear in the continuous stream of image data. As a result, velocity can be used to generate an accurate bounding box around the guest 106A's head as they move in the store 100 and to differentiate the guest 106A's head from the other guests 106B-N in the store 100.

In block D, the edge computing device 104 can generate bounding boxes 108A-N around the guest 106A's head based on the determined velocity V1. The edge computing device 104 can generate the bounding boxes 108A-N using object detection techniques. As described herein, the edge computing device 104 can also apply the object detection model to the continuous stream of digital image data, in which the model can be trained to generate the bounding boxes 108A-N based on the determined velocity V1 of the guest 106A.

As shown in FIG. 1, the guest 106A can appear larger in the frame of the camera 102 as the guest 106A approaches the exit 109, and therefore gets closer to the camera 102. Despite the guest 106A appearing larger in the frame, the edge computing device 104 can utilize the determined velocity V1 of the guest 106A to accurately generate the bounding boxes 108A-N around the guest 106A's head. Here, the edge computing device 104 generates the bounding box 108A around the guest 106A's head at t1, when the guest 106A first appears in the frame of the camera 102. Using the velocity V1 of the guest 106A determined between t1 and t2, the edge computing device 104 is able to generate an accurate bounding box 108B around the guest 106A's head at t2. Similarly, the edge computing device 104 uses the velocity V1 to project where the guest 106A will appear in subsequent, consecutive image frames. At t3, for example, the edge computing device 104 generates the bounding box 108N around the guest 106A's head. As shown in FIG. 1, each of the bounding boxes 108A-N can represent different features of the guest 106A and/or have varying quality or other image features. For example, the bounding box 108A can represent a clearest, sharpest, and/or best-lit image of the guest 106A's head. The bounding box 108B can have good lighting but may not be a sharp image of one or more features of the guest 106A's head. The bounding box 108N can have poor lighting and therefore may not be a good representation of one or more features of the guest 106A's head.

The edge computing device 104 can score the bounding boxes 108A-N for the guest 106A based on features criteria in block E. The features criteria can indicate one or more features to be identified and scored in the bounding boxes 108A-N. As described herein, the edge computing device 104 can apply the object detection model(s), which can be trained to identify and score one or more features appearing in each of the bounding boxes 108A-N (or particular features identified in the features criteria). Various features can be identified and scored. For example, the features can include particular types of facial features, including but not limited to forehead, eyebrows, ears, nose, mouth, eyes, accessories such as hats, scarves, and sunglasses, cheeks, neck, hair, etc. The features can also include one or more visual/image features including but not limited to angle of the guest 106A's face, shadows, lighting, sharpness, blurriness, color, posture, etc. Any combination of the abovementioned features may also be identified and scored in block E. The identified features can be scored based on confidence or likelihood that the features are present in the bounding boxes 108A-N. The identified features can also be scored based on confidence or likelihood that the features are clearly represented in the bounding boxes 108A-N. A higher score can indicate a higher confidence or likelihood that the particular feature is present in the respective bounding box 108A-N and/or that the particular feature is clearly represented.

The edge computing device 104 can generate scores 114 for features identified in each of the bounding boxes 108A-N of the guest 106A. Each bounding box 108A-N can have multiple scores. Each of the scores can correspond to a different feature identified in the respective bounding box 108A-N. In some implementations, one or more of the multiple scores can correspond to a combination of one or more features identified in the respective bounding boxes 108A-N. As shown in the example scores 114 table, the edge computing device 104 has identified and scored the following features in each of the bounding boxes 108A-N for the guest 106A: lighting, chin, eyes, nose, mouth, quality, and body. These features may be defined by the features criteria. One or more other, additional, or fewer features can be identified and scored, as defined by the features criteria used in block E. For example, the edge computing device 104 may identify and score only particular facial features of the guest 106A (e.g., only eyes, only mouth, only profile of the guest 106A's face, only posture, or any combination thereof). As another example, the edge computing device 104 may identify and score particular image or visual features of the respective bounding box 108A-N (e.g., only lighting, only sharpness, only clarity, only angle, or any combination thereof).

Although the score value shown in the scores 114 table is a numeric value on a scale of 0 to 100, one or more other numeric values, scales, float values, integer values, and/or Boolean values can be used to score the features. For example, the score values can be Boolean values such as True/False, Yes/No, Positive/Negative, 1/0 and therefore used to identify whether a particular feature is present in the respective bounding box 108A-N. One or more other score values can be used.

In block F, the edge computing device 104 can select a subset of the bounding boxes 108A-N that satisfy best image criteria. In some implementations, the edge computing device 104 can select one of the bounding boxes 108A-N. In some implementations, the edge computing device 104 can select more than one of the bounding boxes 108A-N. For example, each of the selected bounding boxes in the subset can satisfy a different best image criteria. A first selected bounding box can, for example, be a best representation of the guest 106A's entire face while a second selected bounding box can be a best representation of the guest 106A's eyes. The best image criteria can indicate a threshold score value for one or more particular features that must be met before a bounding box is selected for the subset. For example, a bounding box can be selected for the subset if its lighting, nose, and quality scores each exceed respective threshold score values. Any other combinations of scored features can be defined in the best image criteria. The best image criteria can also require a threshold combination of one or more score values to be met before one or more bounding boxes are selected for the subset. For example, one or more of the bounding boxes 108A-N can be selected if an aggregation of all the score values for the respective bounding box is greater than a threshold aggregate score value. As another example, a bounding box can be selected if an aggregation of particular score values satisfies a threshold aggregate score value.

In the example of FIG. 1, the edge computing device 104 can select the bounding box images 108A and 108N for the subset. The bounding box 108A may be selected because, in the aggregate, the features identified in the bounding box 108A have higher respective score values than the features identified in the bounding boxes 108B-N. As another example, the bounding box 108A may be selected because, when one or more of the score values are combined, the combined score value exceeds a threshold score value. As yet another example, the bounding box 108A may be selected in block F because the bounding box 108A has the highest score value for lighting and/or quality. The bounding box 108A can also be selected for satisfying one or more other best image criteria, as described throughout this disclosure.

Still referring to the example of FIG. 1, the edge computing device 104 can select the bounding box image 108N for the subset because the bounding box image 108N satisfies one or more other best image criteria. For example, although the bounding box 108N has poor lighting and not the best visualization of facial features in comparison to the bounding boxes 108A and 108B, the bounding box 108N can have a best representation of the guest 106A's entire body (or a portion of the guest 106A's body). Therefore, the bounding box 108N can be selected as a best image representing the guest 16A's body.

In block G, the edge computing device 104 can return the subset of images associated with the guest 106A. Returning the subset of images can include transmitting the subset to a computing device of a relevant stakeholder in the store 100, such as an in-store employee and/or safety and security personnel. The relevant stakeholder can then use the subset to objectively associate the guest 106A with particular activity in the store 100, such as a shortage event, theft, or other safety or suspicious activity.

Optionally, the edge computing device 104 can store at least one high resolution image 116 from the subset of the images in block H. The high resolution image 116 can be stored in the data store 110, then later retrieved by the computing device of the relevant stakeholder or another computing system for further processing and analysis. The high resolution image 116 can be used to more accurately associate the guest 106A with activity in the store 100. Therefore, the relevant stakeholder may not have to spend time sifting through a continuous stream of low resolution image data generated by the camera 102 to try and associate the guest with activity in the store 100.

Blocks A-H can be performed at the edge computing device 104 in the store 100. As described herein, performing the blocks A-H at the edge can use less compute resources and provide for efficiently processing image data generated by the camera 102 to select best images of any of the guests 106A-N. The edge computing device 104 can use low processing efforts to down-sample and process the continuous stream of digital image data from the camera 102. Then, once the best images of any of the guests 106A-N are selected in block F, the edge computing device 104 can return the high resolution versions of those best images to be optionally used in associating the respective guest with activity in the store 100. In some implementations, the edge computing device 104 can also return at least a portion of the low resolution continuous stream of image data, which can be used alone or in combination with the high resolution best image(s) to optionally associate the respective guest with activity in the store 100.

In some implementations, one or more of the blocks A-H can be performed at a computing system remote from the store 100. As an illustrative example, the continuous stream of image data from the camera 102 can be down-sampled at the camera 102 then transmitted to the computing system. The computing system can then process the low resolution stream of image data to select best images of one or more of the guests 106A-N. The computing system can then request high resolution versions of the best images from the camera 102 and store the high resolution versions for future use.

Moreover, the blocks A-H can be performed to select best images representing each of the guests 106A-N appearing in the field of view of the camera 102. The blocks A-H can be continuously performed as the continuous stream of image data is captured by the camera 102. The blocks A-H can be performed in real-time as the guests 106A-N are moving around or near the exit 109 of the store 100. The best images selected in real-time can then be used by the relevant stakeholders to monitor, stop, and/or apprehend one or more of the guests 106A-N before they exit the store 100. In some implementations, one or more blocks A-H can be performed at different times, for example in near real-time. The best images selected in near real-time can then be used by the relevant stakeholders to determine which of the guests 106A-N to monitor during subsequent visits to the store 100.

Figure 2:
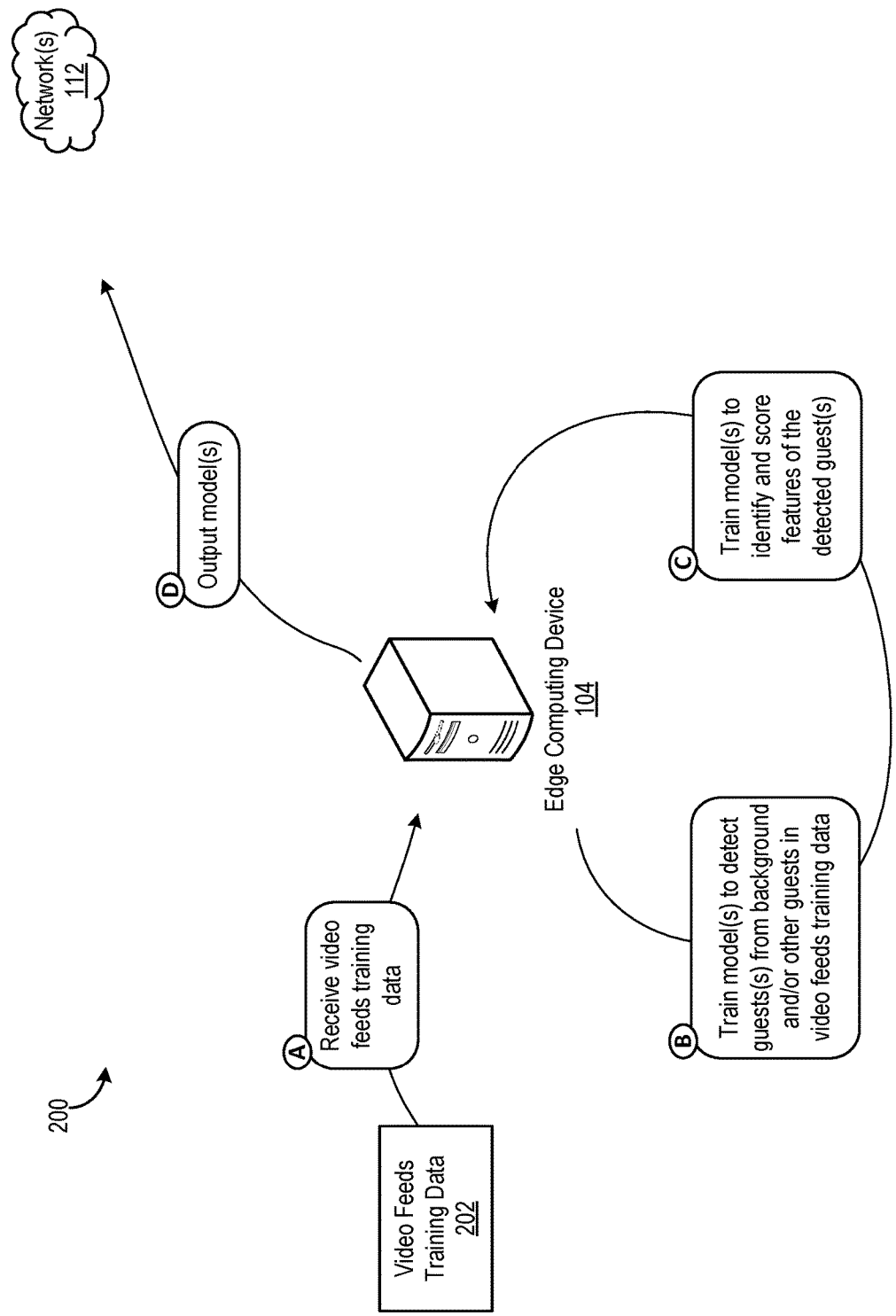
FIG. 2 is a conceptual diagram for training object detection models for use in generating and selecting best images of a guest in a retail environment.

FIG. 2 is a conceptual diagram for training object detection models for use in generating and selecting best images of a guest in a retail environment. The model(s) can be trained using process 200, which can be performed by the edge computing device 104. The training process 200 can also be performed by one or more other computing systems and/or cloud-based services. For example, the model(s) can be trained by a remote computing system using the process 200. The model(s) can then be deployed or installed at the edge computing device 104 after training.

Referring to the process 200, the edge computing device 104 can receive video feeds training data 202 in block A. The video feeds training data 202 can be captured from one or more cameras in one or more retail environments. For example, the data 202 can be collected from a camera positioned near an exit at each of a group of retail environments. The cameras can be positioned at same or similar angles, vantage points, and/or locations in each of the group of retail environments. The data 202 can also be collected in same or similar imaging settings, such as lighting, angle, zoom, pan, tilt, etc. In some implementations, the data 202 can also be captured by cameras having different settings. In some implementations, the data 202 may be collected from cameras in a particular retail environment.

In some implementations, the data 202 can include continuous streams of digital image data that are captured during runtime. For example, the same image data used for training may also be processed to generate and select best images of guests that are leaving the retail environment. In some implementations, the data 202 can include continuous streams of image data that are captured as part of a training phase, before the object detection model(s) are deployed on the edge for runtime use. The data 202 can be annotated and labeled (e.g., by a relevant user and/or automatically by the edge computing device 104 or another computing system) with labels indicating a guest's head, facial features, and/or movement of the guest across the continuous stream of image data.

In block B, the edge computing device 104 can train at least one model to detect at least one guest from a background and/or other guests in the video feeds training data 202. For example, object detection techniques can be used to generate a bounding box around the guest's head and extract the guest's head from the background and/or other guests in the data 202. The model may also be trained to track the bounding box across continuous images in the data 202. For example, the edge computing device 104 can select all images in the data 202 having a bounding box around the guest's head (e.g., consecutive images depicting the guest approaching the exit of the retail environment). The edge computing device 104 can then train the model(s) to compare those images to determine a velocity of the guest as they move. As a result, during runtime, the model(s) can use bounding boxes and velocity to track a particular guest's head (and differentiate the guest from other guests and/or a background) across a continuous stream of image data.

The edge computing device 104 can also train the model(s) to identify and score features of the detected guest(s) (block C). For example, the model(s) can be trained to identify one or more features from the bounding boxes in the data 202. Those features can be labeled and annotated as such in the data 202. The model(s) can then be trained to identify those features. Once the features are identified, the model(s) can be trained to score them. The score can be a confidence value indicating likelihood that the particular feature appears in the data 202 or is accurately captured in the data 202. A higher score, for example, can indicate higher confidence that the particular feature appears in the data 202 and/or can be used (e.g., by a relevant stakeholder) to objectively associate the guest with activity in the retail environment. A lower score can indicate lower confidence that the particular feature appears in the data 202. As an illustrative example, a straight-on and brightly-lit image of a guest's head can more accurately depict the guest's eyes (and therefore have a higher score) than an image in which half of the guest's face is in shadows.

Once the model(s) is trained, the edge computing device 104 can output the model(s) for runtime use (block D). For example, the model(s) can be deployed to and installed as firmware on one or more cameras in one or more retail environments. The model(s) can also be deployed at the edge computing device 104 or other edge computing devices for runtime use. As another example, the model(s) can be stored in a data store, cloud-based system, etc., for runtime deployment. In some implementations, a model can be trained for each retail environment and deployed at edge computing devices and/or cameras at the particular retail environment. In some implementations, models can be trained for a variety of retail environments then deployed at edge computing devices and/or cameras at any one or more of the retail environments.

Figure 3A:
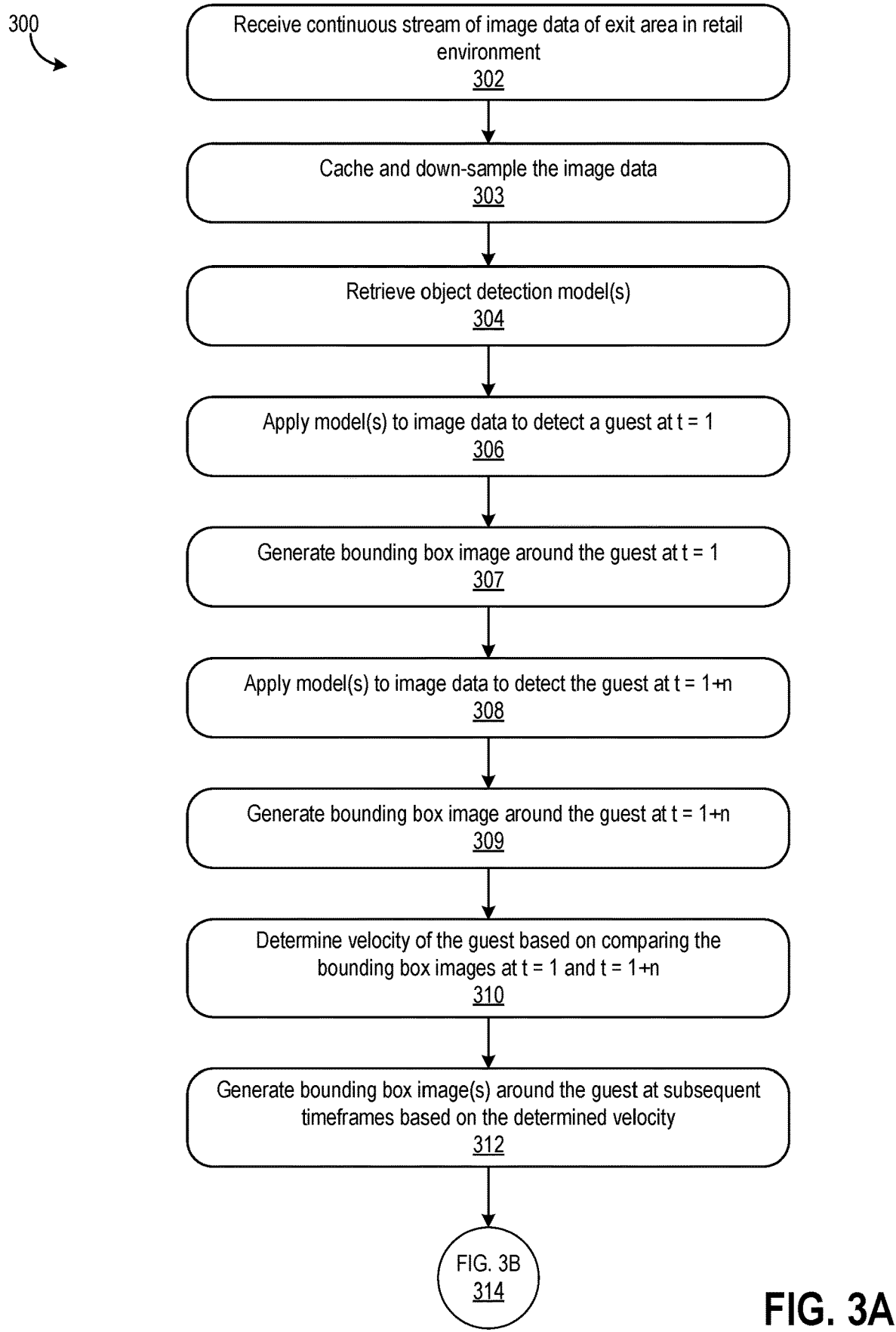
FIGS. 3A-B is a flowchart of a process for generating and selecting best images of a guest in a retail environment using object detection techniques.
Figure 3B:
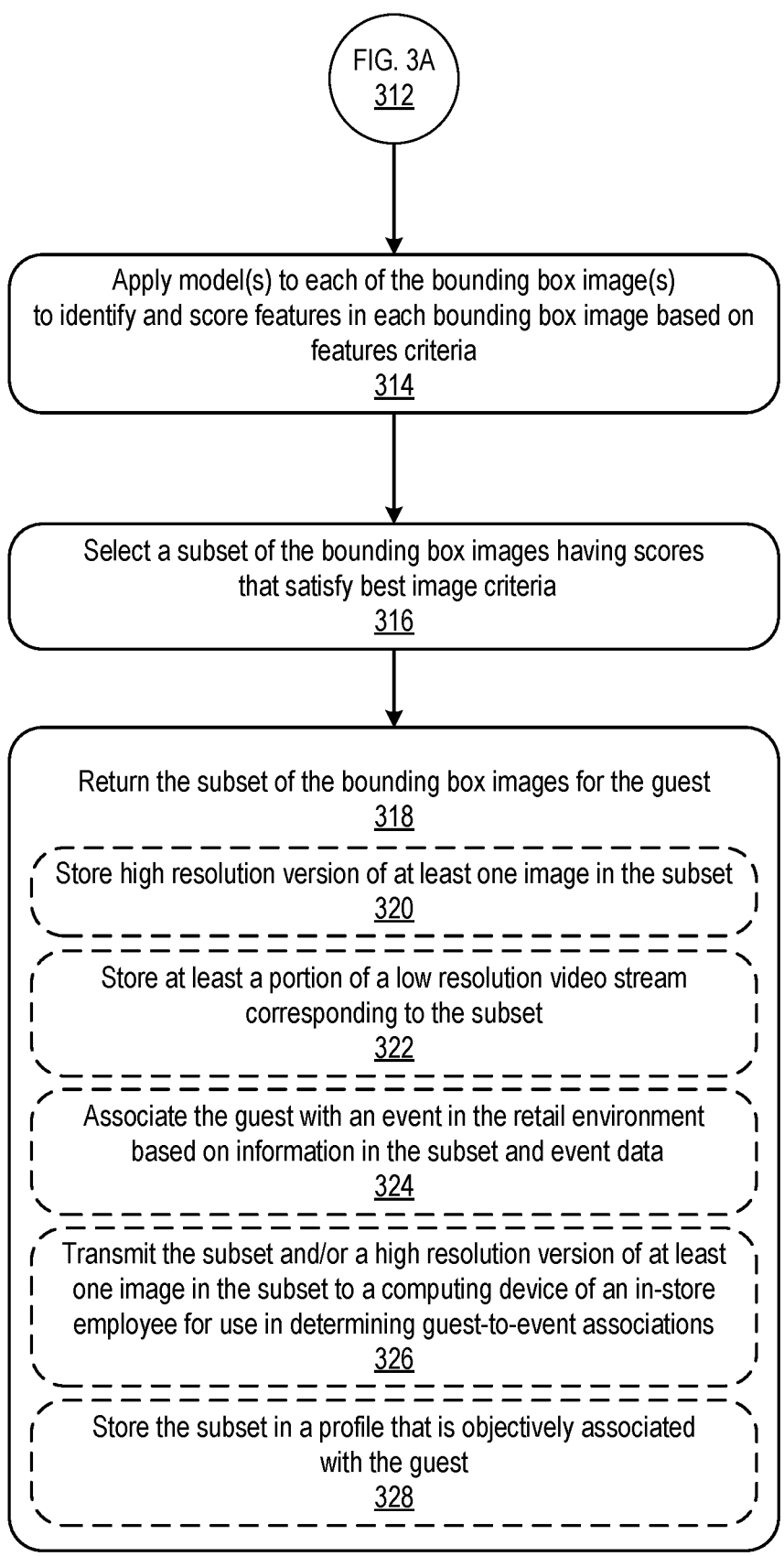

FIGS. 3A-B is a flowchart of a process 300 for generating and selecting best images of a guest in a retail environment using object detection techniques. The process 300 can be performed by the edge computing device 104 in the retail environment. The process 300 can also be performed by one or more other computing systems, devices, computers, networks, cloud-based systems, and/or cloud-based services, such as a computing system that is remote from the retail environment. For illustrative purposes, the process 300 is described from the perspective of an edge computing device.

Referring to the process 300 in both FIGS. 3A-B, the edge computing device can receive a continuous stream of digital image data of an exit area in a retail environment in block 302. As described in reference to FIG. 1, the continuous stream of image data can be a video feed from a camera in the retail environment, such as a camera positioned near or at the exit of the retail environment. As an illustrative example, the continuous stream of image data can be a 5 second video feed. The continuous stream of image data can also be a longer or shorter video feed. As another illustrative example, the camera can be a CCTV camera and the image data can be a video feed as it is captured in real-time by the camera.

In block 303, the edge computing device can cache the continuous stream of image data. The camera can generate a vast amount of data, such as high resolution images, high resolution video, metadata, etc. The edge computing device can cache the high resolution image data but may not process that data because the processing can require significant amounts of CPU cycles and other compute resources. Therefore, the edge computing device can down-sample the image data that is received in block 302. The down-sampled image data can be low resolution versions of the continuous stream of image data, which can then be processed in the process 300 to generate and select best images of a guest appearing in the image data. Processing the low resolution, down-sampled image data on the edge can be beneficial to efficiently and quickly select the best images of the guest without having to transmit large quantities of high resolution image data across networks and thus take up significant amounts of network bandwidth. Instead, the best images can be selected in real-time or near real-time using less compute resources and less CPU cycles on the edge. Once the best images are selected, the edge computing device can retrieve the corresponding cached high resolution image data and return that image data for use in additional processes or analyses. For example, the high resolution image data that corresponds to the best images can be transmitted across networks to a remote computing system and/or a computing device of a relevant stakeholder in the retail environment for use in monitoring and/or associating the guest in the image data with events or other activities in the retail environment. Because only the relevant high resolution image data is being transmitted across the networks rather than all the image data generated by the camera, network bandwidth may be saved and less compute resources and processing power may be consumed to perform the techniques described herein.

In block 304, the edge computing device can retrieve at least one object detection model from a data store. Sometimes, the model(s) can be installed or deployed at the edge computing device after model training. Therefore, the edge computing device may not have to retrieve the model(s) in block 304. The model(s) can be trained using the techniques described in FIG. 2. For example, the model(s) can be trained to detect a guest's features, such as their head, shoulders, upper body, etc., in the image data and generate a bounding box around those features. The model(s) can also be trained to track movement of those features across the image data, such as when the guest moves closer to the camera or moves farther away from the camera. Tracking movement of those features across the image data can include, as described throughout this disclosure, identifying or detecting the features at subsequent timeframes in the image data, generating a bounding box around the features at the subsequent timeframes, determining a velocity of the guest based on a change in pixels between the features in the subsequent timeframes, and projecting where those features will appear at next timeframes within the image data. As a result of determining the velocity and projected where next the features will appear, the edge computing device can track movement of the particular guest's features instead of other guests that may appear in the image data.

In some implementations, the edge computing device can retrieve an appropriate model for use with the particular digital image data received in block 302. For example, if only one guest appears in the image data, the edge computing device can retrieve a model that was trained to detect the guest's features and generate a bounding box around the features at predetermined timeframes in the image data. The model, however, may not be trained to determine the velocity of the guest and then project where the guest will appear next in the image data. As another example, if multiple guests appear in the image data, the edge computing device can retrieve a model that was trained to determine velocity of a particular guest and project where the guest will appear next in the image data so that the edge computing device can accurately generate bounding boxes around a particular guest, not other guests appearing in the image data.

The edge computing device can apply the model(s) to the image data to detect a guest at time t=1 (block 306). As described herein, the model(s) can be trained with object detection techniques to identify particular features, such as a guest's head. The model(s) can be trained to detect one or more other objects in the image data using the training object detection training techniques described in FIG. 2. Object detection techniques can be used to accurately identify features in the image data with minimal compute resources and processing power. Moreover, object detection techniques may allow for objective tracking of identified features across image data (e.g., hair, posture, eyes, shoulders, etc.)

The edge computing device can generate a bounding box image around the guest at t=1 in the image data in block 307. A bounding box can be generated around the guest's features that were detected in block 306.

The edge computing device can apply the model(s) to the image data to detect the guest at t=1+n (block 308). Block 308 can be the same as block 306, except now the edge computing device can be detecting the same guest in a different position or location in the image data. As described herein, the guest can move towards the exit of the retail environment. The guest can also move away from the exit of the retail environment. Regardless of how the guest moves in the image data, the edge computing device can detect the guest using the disclosed techniques. Sometimes, however, some features of the guest may appear with more clarity, better lighting, sharpness, etc. at particular timeframes than in other timeframes. For example, at a first time (t=1), the guest may be walking straight on towards the exit and therefore their entire face can appear in the image data with clarity and uniform lighting. At a second time (t=2), the guest might have turned away from the camera at the exit of the retail environment and their face may appear at an angle in the image data. Half of their face may also appear in shadows. At a third time (t=3), the guest may be facing the camera straight on, but can be walking faster than at the previous times. As a result, although the guest's entire face may be visible in uniform lighting, portions of the guest's face may appear blurry because of the guest's sudden movement. At each of these times that the guest appears in the image data, the edge computing device can detect the guest's features and generate a bounding box around those features, as described further below in reference to blocks 310-312.

Moreover, t=1+n can be any predetermined timeframe in the continuous stream of image data. For example, the timeframe can be every 1 second, such that the edge computing device can detect the guest at 1 second time intervals until the guest no longer appears in the image data. As another example, the timeframe can be every 3 seconds. The timeframe can also be every 5 seconds. One or more other timeframes can also be used, including but not limited to every 2 seconds, 4 seconds, 6 seconds, 7 seconds, 8 seconds, 9 seconds, 10 seconds, etc.

The edge computing device can then generate a bounding box image around the guest at t=1+n (block 309). Block 309 can be performed similarly as described in reference to block 307.

The edge computing device can determine a velocity of the guest based on comparing the bounding box images at t=1 and t=1+n in block 310. Velocity can be determined based on identifying a change in pixels between the guest's features in the bounding box image at t=1 and the guest's features in the bounding box image at t=1+n. The edge computing device can also determine a trajectory or line of movement of the guest between the two bounding box images based on identifying and comparing a location of the pixels representing the guest's features in the bounding box image at t=1 and a location of the pixels representing the guest's features in the bounding box image at t=1+n. Refer to blocks 414-418 in the process 400 in FIGS. 4A-B for further discussion about determining the velocity.

In some implementations, the edge computing device may determine the velocity of the guest only if multiple guests are detected in the digital image data in blocks 306 and/or 308. Velocity can then be used to project movement of a particular guest across the image data so that the edge computing device can accurately track the particular guest at subsequent timeframes and generate bounding boxes around the particular guest instead of other guests appearing in the image data.

In block 312, the edge computing device can generate at least one bounding box image around the guest at subsequent timeframes based on the determined velocity of the guest. For example, the edge computing device can project where the guest will appear next in the image data, or at a subsequent timeframe to t=1+n. The edge computing device can generate a bounding box at that projected location without having to first apply the model(s) to the image data to detect the guest's features. As a result, the edge computing device can use fewer compute resources to efficiently detect the guest as the guest moves in the image data.

The edge computing device can apply the model(s) to each of the bounding box images to identify and score features in each bounding box (block 314). In some implementations, the edge computing device can apply one or more different models than the object detection model described above. Sometimes, for example, the edge computing device can use object detection techniques and algorithms to generate the bounding box images around the guest in the image data, then apply one or more models for identifying and scoring features appearing in each of the bounding box images. The edge computing device can apply a model for identifying the features and another model for scoring the features. The edge computing device can also apply a model that identifies and scores the features. In some implementations, the object detection model(s) described above can identify and score the features when the guest is detected in the image data (blocks 306 and 308) and/or when the bounding box images are generated (blocks 307 and 309).

Identifying and scoring the features in the bounding box images can be based on features criteria. For example, the features criteria can indicate that a guest's eyes, nose, and mouth should be identified in the bounding box images, in the same bounding box image or across multiple bounding box images (e.g., one image can show the guest's eyes and another image can show the guest's nose and mouth). The features criteria can also indicate that a full front-on view of the guest's face should appear in at least one of the bounding box images. The features criteria can indicate one or more additional or fewer features, or any combination thereof, that should be identified and scored in the bounding box images of the guest. The features criteria can also be defined by relevant stakeholders in the retail environment, such as safety and security personnel. For example, the safety and security personnel can determine which features may be most important to help them objectively and quickly associate the guest in the retail environment with activity, such as a shortage event or a ticket switching event. Those features can then be added to the features criteria and used by the edge computing device in block 314. The features criteria can also be unique to each retail environment in a network of retail environments. The edge computing device can then retrieve the features criteria associated with the particular retail environment to be used in identifying and scoring the features of the guest(s) appearing in the image data in that retail environment.

Scoring the guests features can be based on scoring criteria, which can be the same as or different than the features criteria. The scoring criteria can indicate numeric values, float values, integer values, and/or Boolean values that can be assigned to each of the features identified in the bounding box images. Each identified feature can be scored on one or more numeric or integer scales, where the score can indicate a likelihood that the particular feature is present and/or a clarity of that particular feature. For example, the more apparent the guest's eyes appear in a bounding box image, the higher the corresponding feature score. The score can also indicate a confidence value or level that the particular feature appears in the bounding box image. For example, a first bounding box image can have a score of False because the guest's eyes are not visible but a second bounding box image can have a score of True because the guest's eyes are visible. One or more other scoring metrics can be defined in the scoring criteria and used to score the identified features. The scoring criteria may also indicate one or more combinations of identified features that can be scored in each of the bounding box images. Refer to the process 500 in the process 500 of FIG. 5 for further discussion about identifying and scoring features of the guest in the bounding box images.

The edge computing device can select a subset of the bounding box images having scores that satisfy best image criteria (block 316). The best image criteria can indicate one or more score values for one or more particular features (or combinations of features) in a bounding box image that must satisfy threshold score values. If the threshold score value(s) is satisfied for the bounding box image, the edge computing device can select that bounding box image for inclusion in the subset. As an illustrative example, the best images criteria can indicate that a front-view of the guest's face has a score that satisfies a first threshold score value, that an eyes feature has a score satisfying a second threshold score value, that a hair feature has a score satisfying a third threshold score value, and that a sharpness feature has a score that satisfies a fourth threshold score value. Sometimes, one of the bounding box images may satisfy more than one of the threshold score values mentioned above and thus the one image can be selected for inclusion in the subset. Sometimes, more than one of the bounding box images may satisfy the above threshold score values and therefore those images can be selected for inclusion in the subset (e.g., a bounding box image can satisfy both the first and second threshold score values, another bounding box image can satisfy the third threshold score value, and yet another bounding box mage can satisfy the fourth threshold score value).

In block 318, the edge computing device can return the subset of the bounding box images for the particular guest. The edge computing device can return all of the bounding box images in the subset. The edge computing device can return a threshold quantity of the images in the subset, such as the bounding box images in the subset having scores that exceed some threshold score value. As described above, the subset can include multiple bounding box images, where each of the images satisfies different best image criteria (e.g., each image shows one or more particular features of the guest or other image features defined in the best images criteria). Sometimes, the subset can include only one image (e.g., a bounding box image that shows the most facial features of the guest, an image that shows a best angle/lighting of particular features like the guest's eyes, an image that shows the guest's face in the best quality/sharpness). Refer to the process 600 in FIG. 6 for additional discussion about selecting and returning the subset of the bounding box images representing the best image(s) of the guest.

Returning the subset of the bounding box images for the guest can optionally include storing a high resolution version of at least one image in the subset in block 320. As described herein, the edge computing device can retrieve the high resolution version of at least one of the images in the subset that was cached in block 303. The retrieved high resolution image(s) can then be stored in a data store and used for future processing and/or analysis. For example, a relevant stakeholder at a computing device can retrieve the high resolution image(s) of the guest from the data store and use the high resolution image(s) to objectively associate the guest with activity in the retail environment. Transmitting the high resolution image(s) of the guest over a network can use less network bandwidth and processing power than transmitting the continuous stream of digital image data captured by the camera(s) and/or other data generated by the camera (e.g., all high resolution image data, metadata, timestamps) so that quick and efficient guest-to-event associations can be made at the computing device. Moreover, transmitting only the high resolution image(s) of the guest over the network can save available compute resources to be more efficiently used by the edge computing device in processing the continuous stream of image data and selecting best images of the guest on the edge.

Returning the subset can optionally, additionally, or alternatively include storing at least a portion of a low resolution video stream corresponding to the subset in block 322. The low resolution video stream corresponding to the subset can be stored in the data store. The low resolution video stream can then be retrieved, for example, by the relevant stakeholder at the computing device for use in objectively associating the guest with activity in the retail environment. The relevant stakeholder can sometimes retrieve both the high resolution image(s) of the guest and the low resolution video stream to make more informed, unbiased associations of the guest with various activities in the retail environment.

Figure 7A:
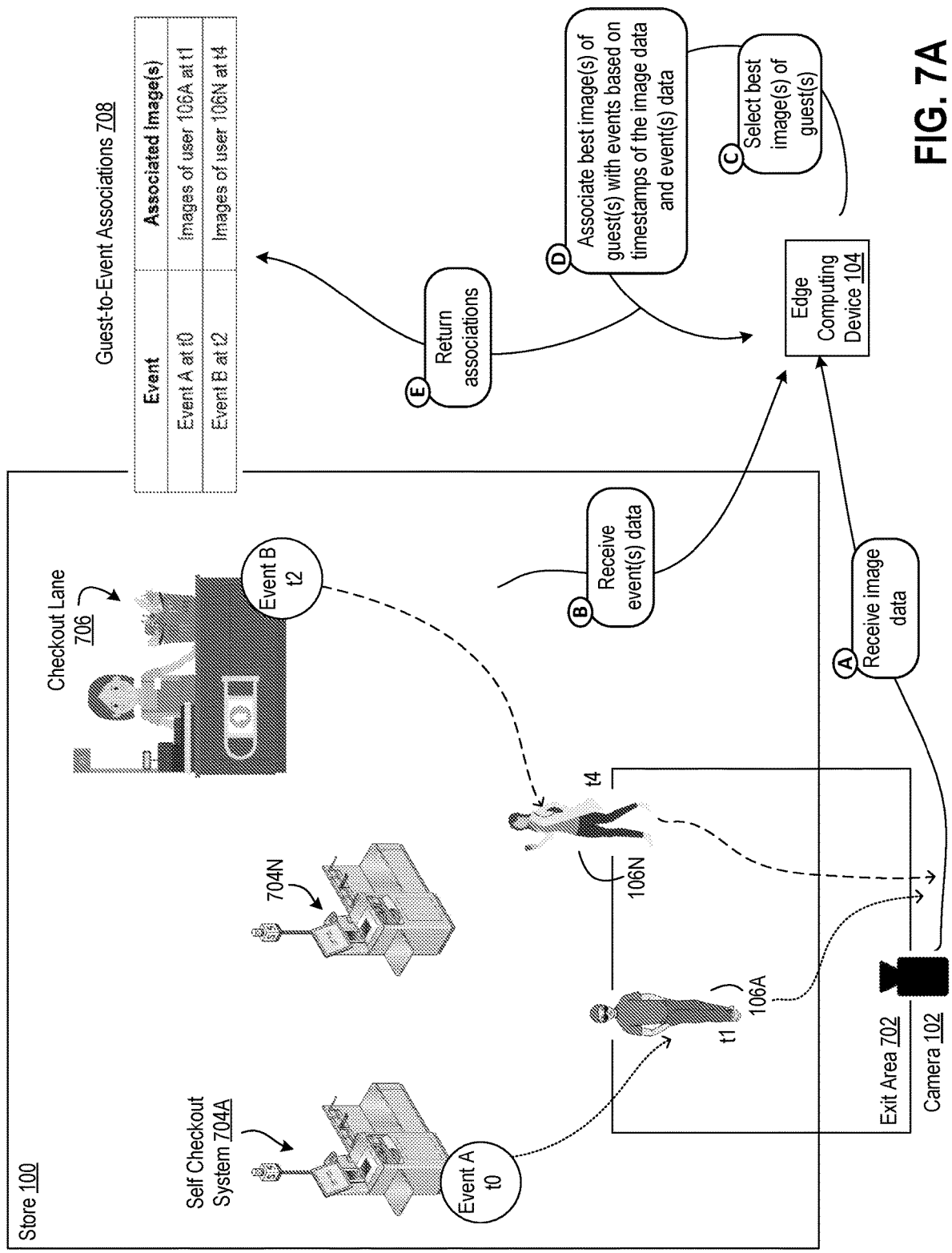
FIG. 7A is a conceptual diagram for associating a guest with an event in a retail environment using best images of the guest.
Figure 7B:
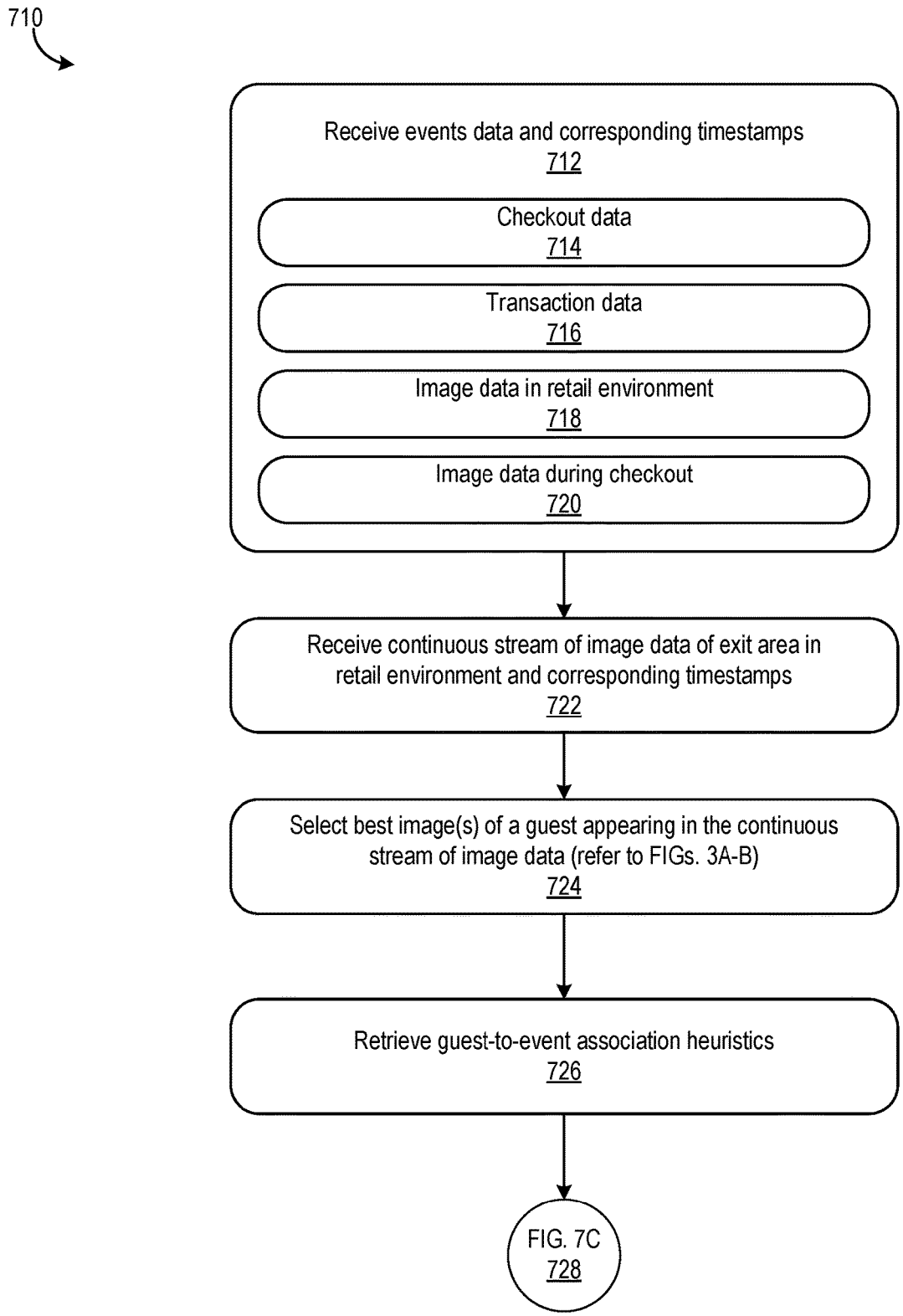
FIGS. 7B-C is a flowchart of a process for associating a guest with an event in a retail environment using best images of the guest, as illustrated in FIG. 7A.
Figure 7C:
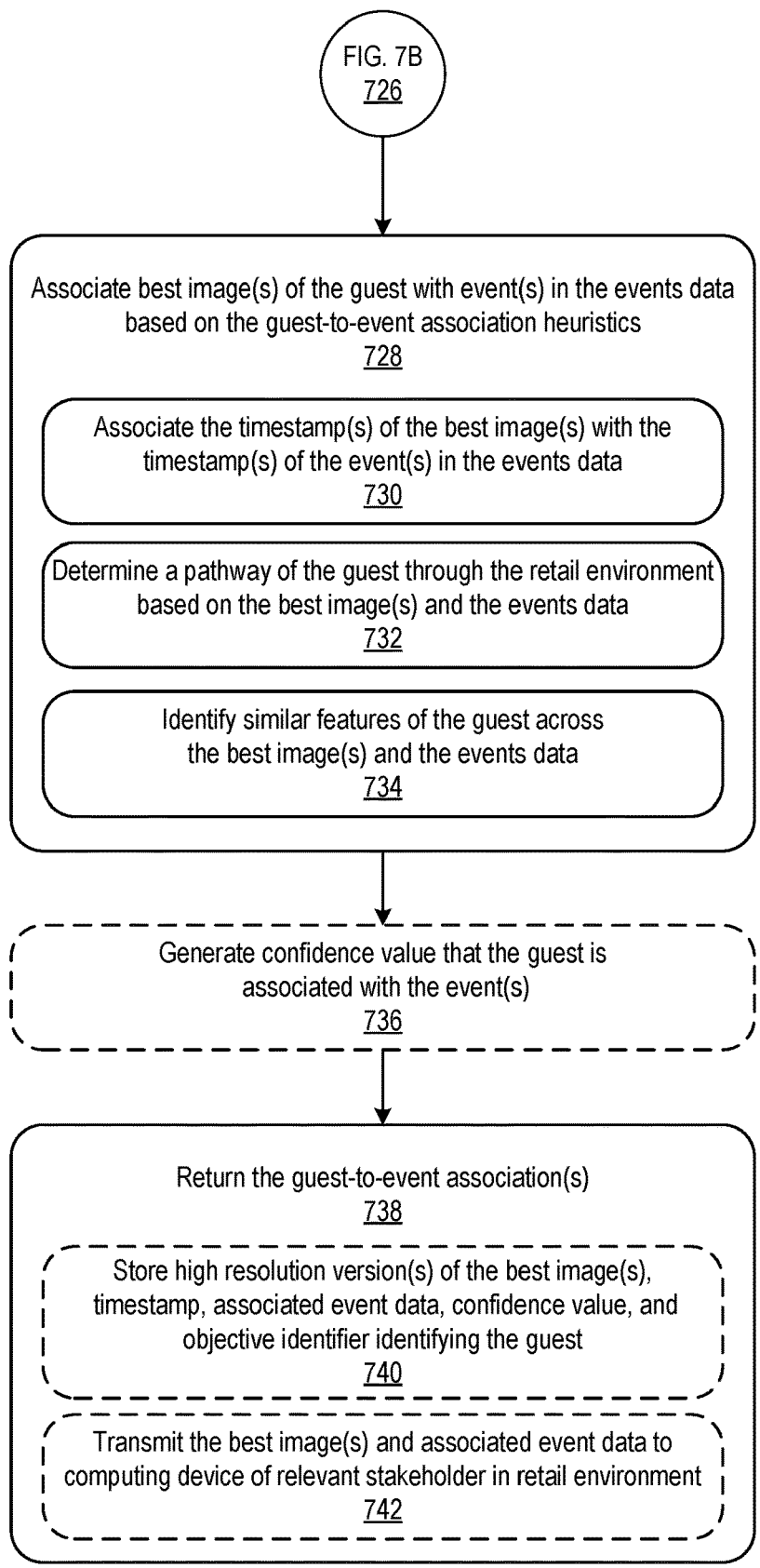

Returning the subset can optionally, additionally, or alternatively include associating the guest with an event in the retail environment based on information in the subset (e.g., metadata such as timestamps associated with each bounding box image in the subset) as well as event data (block 324). The edge computing device can be make system-based inferences indicating a likelihood that the particular guest is associated with a particular activity or event(s) in the retail environment. In some implementations, the relevant stakeholder can associate the guest with the event(s) in the retail environment based on the information in the subset. Refer to FIGS. 7A-C for further discussion about making guest-to-event associations based on the subset of best images of the guest and event data.

Returning the subset can optionally, additionally, or alternatively include transmitting the subset and/or a high resolution version of at least one image in the subset to a computing device of an in-store employee or other relevant user for use in determining guest-to-event associations (block 326). As described above, the in-store employee can be the relevant stakeholder, such as safety and security personnel. The in-store employee can use the subset and/or high resolution version of at least one image in the subset to objectively monitor the guest during a current shopping trip in the retail environment and/or future shopping trips in the retail environment. For example, by monitoring the guest, the in-store employee can determine whether the guest should be added to a watch list for the retail environment. The in-store employee can also perform one or more other actions based on objectively monitoring the guest, including but not limited to apprehending the guest, performing a bag check on the guest before they leave the retail environment, checking the guest's receipt before they leave the retail environment, reporting the guest to law enforcement, assisting the guest during a checkout process in the retail environment, etc.

Similar to block 326, returning the subset can optionally include transmitting one or more high resolution images from the subset and/or a low resolution video stream corresponding to the subset to the computing device of the in-store employee. The in-store employee can then use the high resolution images in combination with the low resolution video stream to more accurately, objectively, and efficiently associate the guest with activity in the retail environment.

Returning the subset can optionally, additionally, or alternatively include storing the subset in a profile that is objectively associated with the guest (block 328). Each guest in the continuous stream of image data can be associated with a profile. The edge computing device can generate the profile per guest using objective identifiers that are associated with the guest. The objective identifiers can include, but are not limited to, the guest's user account information (e.g., email address, username) with the retail environment, phone number, credit card information, MAC address, etc. The objective identifier for the guest can be identified or otherwise retrieved from data generated by computing systems/devices in the retail environment, such as a point-of-sale (POS) terminal or checkout system during a checkout process. The profile can be stored in the data store. The relevant stakeholder can retrieve the profile for the guest and use it to monitor the guest in the retail environment and/or associate the guest with activity in the retail environment.

The process 300 can continue to be performed so long as the guest appears in the continuous stream of image data (e.g., if the guest appears in the image data for 5 seconds, the process 300 can be performed for that duration of time until best images of the guest are selected). The process 300 can also be performed so long as any guest appears in the image data (e.g., a first guest may no longer appear in the image data at t=3 but a second guest may now appear at t=3, so the process 300 can be performed at t=3 to select best images of the second guest).

The process 300 can also be performed concurrently to select best images of each guest that appears in the same continuous stream of image data. For example, best images of a first guest can be isolated in the image data at times 1, 3, and 5 while best images of a second guest can be isolated in the same image data at times 1 and 2. Because low resolution image data is processed using the disclosed techniques, the edge computing device can use available and/or limited compute resources to perform the process 300 multiple times to select best images of multiple different guests on the edge.

In some implementations, the process 300 can be performed at different times to select best images of each of the guests appearing in the same continuous stream of image data (e.g., best images of a first guest can be determined in real-time and best images of a second guest can be determined in near real-time once the best images of the first guest are selected).

Figure 4A:
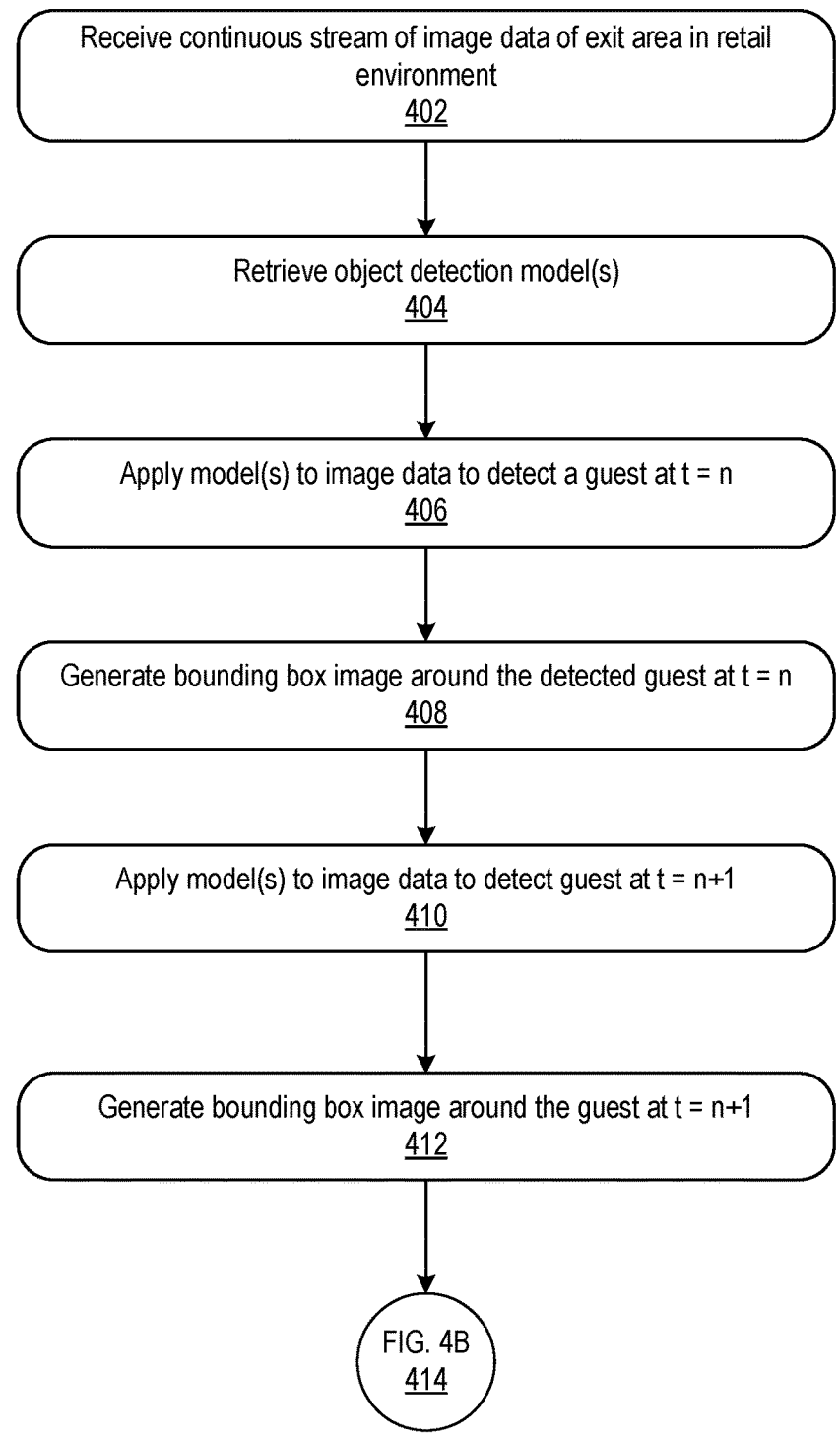

FIGS. 4A-B is a flowchart of a process 400 for generating bounding box images around a guest as they move in a retail environment. Object detection and tracking techniques can be used in the process 400 in order to track movement of the guest in digital image data. Such object detection and tracking techniques consumes less processing power, network bandwidth, and/or CPU cycles than other tracking techniques, thereby allowing the process 400 to be performed efficiently on the edge.

The process 400 can be performed by the edge computing device 104 in the retail environment. The process 400 can also be performed by one or more other computing systems, devices, computers, networks, cloud-based systems, and/or cloud-based services, such as a computing system that is remote from the retail environment. For illustrative purposes, the process 400 is described from the perspective of an edge computing device.

Referring to the process 400 in FIGS. 4A-B, the edge computing device can receive a continuous stream of image data of an exit area in the retail environment in block 402. Refer to block 302 in the process 300 of FIGS. 3A-B for further discussion.

The edge computing device can retrieve at least one object detection model in block 404. Refer to block 304 in the process 300 of FIGS. 3A-B for further discussion.

In block 406, the edge computing device can apply the model(s) to the image data to detect a guest at t=n. Refer to block 306 in the process 300 of FIGS. 3A-B for further discussion.

The edge computing device can generate a bounding box around the detected guest at t=n in the image data in block 408. Refer to block 307 in the process 300 of FIGS. 3A-B for further discussion.

In block 410, the edge computing device can apply the model(s) to the image data to detect the guest at t=n+1. Refer to block 308 in the process 300 of FIGS. 3A-B for further discussion.

The edge computing device can accordingly generate a bounding box around the guest at t=n+1 in block 412. Refer to block 309 in the process 300 of FIGS. 3A-B for further discussion.

In block 414, the edge computing device can determine a velocity of the guest between times t=n and t=n+1. For example, in block 416, the edge computing device can determine a change in pixel values between the bounding box at t=n and the bounding box at t=n+1. The edge computing device can identify and count pixels representing the guest in the bounding box at t=n. The edge computing device can identify and count pixels representing the guest in the bounding box at t=n+1. The edge computing device can find a difference between the pixel counts to determine how far and where the pixels representing the guest in the bounding box at t=n moved in the bounding box at t=n+1. In block 418, the edge computing device can project a location and/or trajectory/line of movement of the particular guest at time t=n+2 based on the change in the pixel values.

Accordingly, the edge computing device can use the determined velocity of the guest to generate a bounding box around the guest at t=n+2 (block 420). As mentioned above, because the edge computing device can use the determined velocity to project movement of the guest in the image data, the edge computing device can generate a bounding box around an area in the image data where the guest is expected to be.

The edge computing device can also determine whether the guest is detected in the continuous stream of image data at t=n+3 in block 422. In other words, block 422 can be performed to determine whether the guest no longer appears in the image data. The guest may no longer appear in the image data if the guest has exited the retail environment or otherwise moved outside of a field of view of the camera.

If the guest is detected (e.g., the guest may be approaching or otherwise getting closer to the camera in the exit area of the retail environment), the edge computing device can generate a bounding box around the guest at t=n+3 based on the determined velocity (block 424). Refer to block 420 for further discussion.

The edge computing device can then determine whether the guest continues to be detected in the image data in block 426. As described above, the guest can continue to be in the image data so long as the guest is moving towards the camera and/or before the guest exits the retail environment/ is no longer in the field of view of the camera. If the guest is still detected, the edge computing device can loop back to block 424 and continue to generate bounding boxes around the guest based on the velocity. If the guest no longer appears in the image data (e.g., the guest is no longer within the field of view of the camera, such as the guest exited the retail environment), the edge computing device can proceed to block 428, described below.

Referring back to block 422, if the guest is not detected in the image data at t=n+3, the edge computing device can proceed to block 428, in which the edge computing device can return the bounding box images of the guest.

The edge computing device can then identify and score features of the guest and/or image quality features in the bounding box images that are returned in block 428. Refer to block 314 in the process 300 of FIGS. 3A-B and the process 500 in FIG. 5 for further discussion about identifying and scoring features in the bounding box images. In some implementations, the edge computing device may identify and/or score features of the guest and/or image quality features as the bounding box images are generated in blocks 408, 412, and/or 424.

Figure 5:
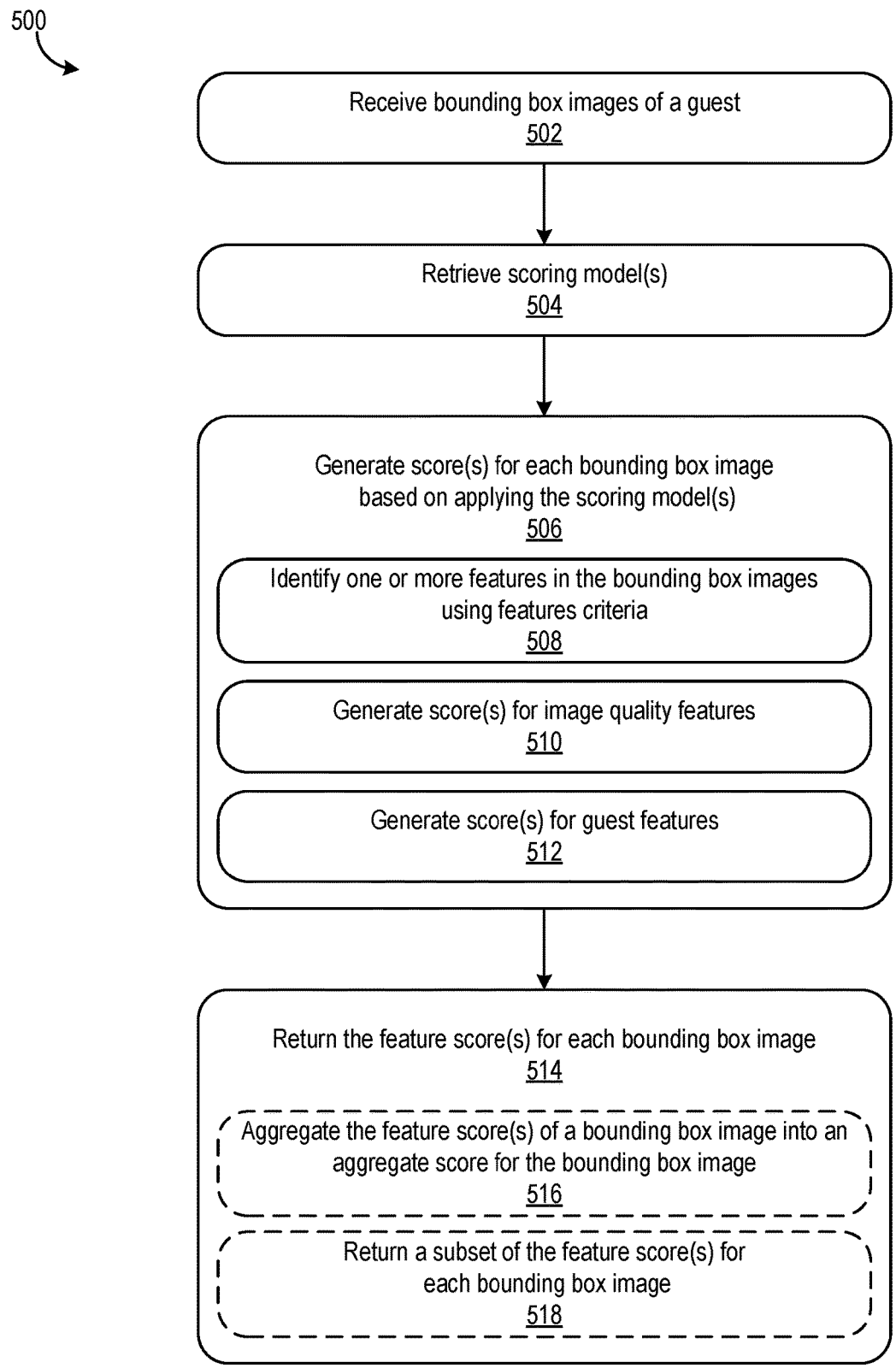
FIG. 5 is a flowchart of a process for scoring bounding box images of a guest to generate and select best images of the guest.

FIG. 5 is a flowchart of a process 500 for scoring bounding box images of a guest to generate and select best images of the guest. As described herein, the bounding box images can be scored based on whether they include one or more guest features and/or image quality features as defined in features criteria and/or scoring criteria. The bounding box images can be scored based on quality of the identified features relative to each other. For example, a bounding box image that more clearly represents the guest's eyes can be scored higher than another bounding box image in which the guest's eyes may appear blurry or partly in shadows.

The process 500 can be performed by the edge computing device 104 in the retail environment. The process 500 can also be performed by one or more other computing systems, devices, computers, networks, cloud-based systems, and/or cloud-based services, such as a computing system that is remote from the retail environment. For illustrative purposes, the process 500 is described from the perspective of an edge computing device.

Referring to the process 500 in FIG. 5, the edge computing device can receive bounding box images of a guest in block 502. For example, the edge computing device can use the bounding box images that were returned in block 428 in the process 400 of FIGS. 4A-B.

The edge computing device can retrieve one or more scoring models in block 504. The model(s) can be retrieved from a data store. The model(s) can also be locally installed on/stored at the edge computing device for quick runtime deployment thereon. The model(s) can be the same as the object detection models described herein (e.g., refer to FIG. 2 for training the object detection models). The model(s) can also be different than the object detection models described herein. For example, the scoring model(s) can be trained using similar techniques as described in FIG. 2 to identify particular types of features in the bounding box images and then score those identified features. Each model can be trained to identify and/or score a different type of feature or combination of features. Multiple models can also be applied to the bounding box images to identify and/or score various different features. A scoring model can, for example, be trained to identify and/or score particular facial features of the guest, such as a forehead, eyebrows, eyes, nose, mouth, cheeks, chin, ears, hair, or any combination thereof. Another scoring model can be trained to identify and/or score particular image quality features, such as clarity, sharpness, brightness, shadows, blurriness, angle of the guest's face, or any combination thereof. In some implementations, one or more models can be used for identifying features in the bounding box images and one or more other models can be used for scoring the identified features.

In block 506, the edge computing device can generate at least one score for each of the bounding box images by applying the scoring model(s) to the bounding box images. The edge computing device can generate a score for each feature identified in a bounding box image. The edge computing device can generate a score for a combination of one or more features identified in the bounding box image. The edge computing device can also determine a score or multiple scores for each identified feature, then aggregate one or more combinations of the scores to generate the at least one score for each bounding box image. For example, the edge computing device can generate a score for each feature identified in the bounding box image, then aggregate those scores to determine an overall feature score for the bounding box image. How the features in the bounding box images are scored can vary depending on features criteria and/or scoring criteria that are used by the edge computing device, as described further below.

As part of scoring the bounding box images, the edge computing device can identify one or more features in the bounding box images using features criteria (block 508). All of the bounding box images for the particular guest can be scored using the same features criteria. Sometimes, one or more of the bounding box images for the particular guest may be scored using different features criteria. For example, some of the bounding box images of the guest can be scored based on presence of particular image quality features (e.g., lighting, blurriness, sharpness, shadows, angle, any combination thereof) while other bounding box images of the guest can be scored based on presence of particular guest features (e.g., forehead, hair, eyes, nose, mouth, chin, any combination thereof). As described herein, the features criteria can indicate which features should be detected and identified in the bounding box images.

The scoring model(s) applied by the edge computing device can be trained to detect and identify the particular features as defined by the features criteria. The model(s) can be trained with a robust training dataset of many images of guests in which particular features are labeled and annotated. The images can be taken under same or similar camera settings. The images can also be taken under different camera settings, such as lighting, angle, sharpness, etc. Training the model(s) with this robust training dataset can provide for accurate runtime identification of particular features that may appear in the bounding box images. Moreover, as described herein, each model can be trained to detect and identify a different feature or combination of features in digital image data.

As part of scoring, the edge computing device can generate at least one score for image quality features that were identified in each of the bounding box images (block 510). Such features can include, but are not limited to, clarity, lighting, quality, sharpness, amount of guest visible, blurriness, angle, and/or any combination thereof. As part of scoring, the edge computing device can additionally or alternatively generate at least one score for guest features that have been identified in each of the bounding box images (block 512). Such features can include but are not limited to eyes, nose, mouth, face, chin, forehead, hair, clothing, angles, accessories, posture, angle, profile, full face, and/or any combination thereof.

The scoring model(s) can be trained to generate the scores in blocks 510 and/or 512 based on identification of the features in a respective bounding box image. The scores can also be generated based on scoring criteria, as described herein. The scoring criteria can indicate what values can be assigned to each of the identified features (or combination of features) in the bounding box image. In some implementations, the scoring model(s) can be trained to generate a confidence value indicating a likelihood that a particular feature is identified in the bounding box image. The edge computing device can then generate a feature score for the particular feature based on the confidence value. For example, the edge computing device can convert the confidence value to a feature score on a predefined scoring scale, such as a value between or within a range of 0 to 100, 1 to 100, 1 to 10, 0 to 10, etc. In some implementations, the scoring model(s) can be trained to convert the confidence value to the feature score.

As described throughout this disclosure, the feature score can indicate a presence of the particular feature in the bounding box image. The feature score can also indicate a confidence that the particular feature is clearly represented in the bounding box image. The feature score can be a numeric value, integer, or float on a predetermined scale, such as on a scale within a range of 0 to 1, 0 to 10, 0 to 50, 0 to 100, 1 to 10, 1 to 50, 1 to 100, etc. A higher feature score value can indicate that the particular feature is clearly represented in the bounding box image (e.g., both the guest's eyes appear in good lighting and sharpness in the image) whereas a lower feature score value can indicate that the particular feature is not as clearly represented (e.g., only one of the guest's eyes appear in good lighting and sharpness in the image). In some implementations, the feature score can indicate presence of the particular feature. In such scenarios, a higher feature score value can indicate a higher likelihood that the particular feature appears in the bounding box image (e.g., both the guest's eyes appear in the image, regardless of whether the eyes are easily discernible from the image) and a lower feature score value can indicate a lesser likelihood that the particular feature appears in the bounding box image (e.g., the guest's eyes are both in shadows and the eyes may not be easily discernible from other facial features in the image). The feature score can also be determined and/or assigned values based on one or more other scoring criteria.

The edge computing device can return the feature score(s) for each bounding box image in block 514. As part of returning the feature score(s), the edge computing device can optionally aggregate the feature score(s) of a bounding box image into an aggregate score for the bounding box image (block 516). Scoring criteria can indicate that one or more particular feature scores should be summed, averaged, or otherwise aggregated to generate the aggregate score for the bounding box image. As an illustrative example, scores for forehead, eyes, nose, mouth, and chin can be aggregated to generate an overall face score. The overall face score can be a numeric value indicating how well the respective bounding box image represents the guest's entire face. A bounding box image having the highest overall face score can, for example, be selected as a best image of the guest and thus used for accurately and objectively identifying, monitoring, and/or associating the guest with activity in the retail environment.

As part of returning the feature score(s), the edge computing device can optionally, additionally, or alternatively return a subset of the feature score(s) for each bounding box image (block 518). Scoring criteria can indicate which of the identified and scored features are most relevant to selecting best images of the guest. For example, in a particular retail environment, scoring criteria can define best images as images having a front-on view of the guest's face (e.g., the guest's face is not angled away from the camera capturing the image data). The bounding box images of the guest can be scored based on an angle at which the guest appears in the images. The more straight-on the guest appears in a respective bounding box image, the higher the score assigned to that bounding box image. The bounding box image having the highest score (or a score that exceeds some threshold score value) can then be identified and returned in block 518 as having a best front-on view of the guest. In some implementations, for each bounding box image, the edge computing device can return the highest feature scores, a threshold quantity of the feature scores, and/or feature scores that satisfy one or more respective threshold score values.

Using the returned feature score(s), the edge computing device can select a subset of the bounding box images that best represent the guest. The subset of the bounding box images can be at least one best image of the guest. Refer to block 316 in the process 300 of FIGS. 3A-B and the process 600 in FIG. 6 for further discussion.

Figure 6:
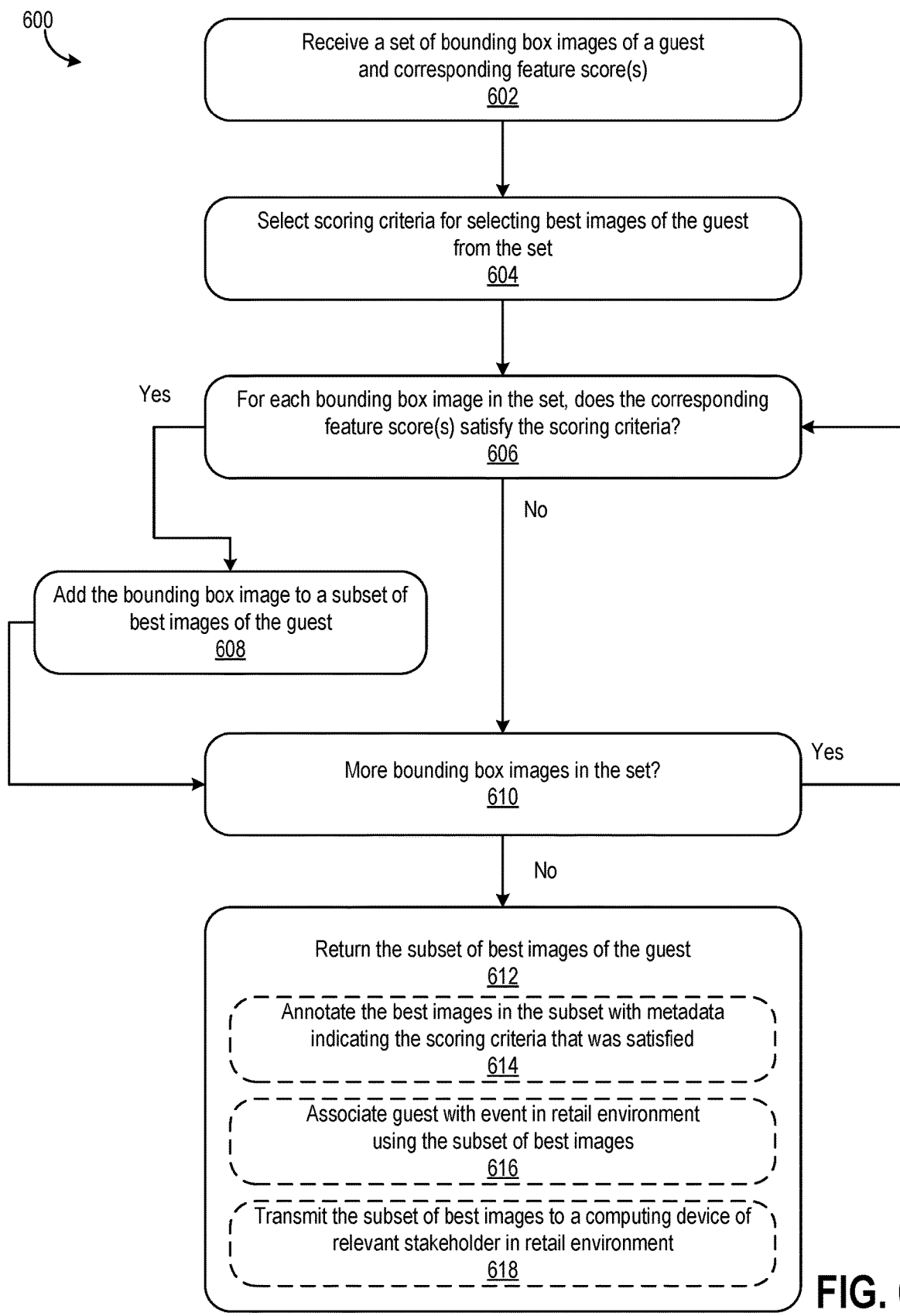
FIG. 6 is a flowchart of a process for selecting a subset of bounding box images of a guest as best images of the guest based on at least one feature score assigned to each of the bounding box images.

FIG. 6 is a flowchart of a process 600 for selecting a subset of bounding box images of a guest as best images of the guest based on at least one feature score assigned to each of the bounding box images. The process 600 can be performed by the edge computing device 104 in the retail environment. The process 600 can also be performed by one or more other computing systems, devices, computers, networks, cloud-based systems, and/or cloud-based services, such as a computing system that is remote from the retail environment. For illustrative purposes, the process 600 is described from the perspective of an edge computing device.

Referring to the process 600 in FIG. 6, the edge computing device can receive a set of bounding box images of a guest and corresponding feature score(s) in block 602. The process 600 can be performed using the feature scores that are returned for each of the bounding box images of the guest in blocks 514-518 in the process 500 of FIG. 5.

In block 604, the edge computing device can select scoring criteria for selecting best images of the guest from the set. Different scoring criteria can be selected based on the particular retail environment, the type of camera used for capturing the image data, camera settings, particular features that were identified in the bounding box images, and/or particular needs of relevant stakeholders who monitor guest activity in the retail environment.

The scoring criteria can be defined for specific features identified in the bounding box images of the set. For example, specific facial features and/or image quality features (e.g., side view, profile, straight-on view, shadows, lighting, size of certain features like eyes, sharpness of certain features, eyes, forehead, nose, mouth, chin, etc., any combination thereof). The scoring criteria, as described in reference to the process 500 in FIG. 5 can also require combining one or more scores for one or more features identified in each of the bounding box images. The scoring criteria can then require comparing the combine score(s) to a threshold score value.

For each bounding box image in the set, the edge computing device can determine whether the corresponding feature score(s) (or combination of feature scores) satisfy the scoring criteria (block 606). For example, the edge computing device can determine whether each feature score for the bounding box image satisfies or exceeds a respective threshold score value. The edge computing device can determine whether a threshold quantity of the feature scores for the bounding box satisfies or exceeds the respective threshold score values. The edge computing device can determine whether an aggregate score for the bounding box image satisfies a threshold aggregate score value. The edge computing device can also determine whether any combination of feature scores for the bounding box image satisfies or exceeds a combined threshold score value.

If the scoring criteria is satisfied in block 606 for a particular bounding box image in the set, the edge computing device can add that bounding box image to a subset of best images of the guest (block 608). For example, a bounding box image having a highest score for an aggregate of all facial features can be selected in block 608 as a best image of the guest. As another example, a bounding box image having a lighting feature score that exceeds a threshold lighting score can be selected as a best image of the guest. The edge computing device can then proceed to block 610, as described further below.

If the scoring criteria is not satisfied in block 606 for the particular bounding box image in the set, the edge computing device can determine whether there are more bounding box images in the set in block 610. In other words, the particular bounding box image may not be a best image of the guest and therefore may not be added to the subset of best images of the guest. The edge computing device can continue to assess any remaining bounding box images of the guest against the scoring criteria to determine whether one or more of those remaining bounding box images can be used as best images of the guest.

If there are more bounding box images in the set in block 610, the edge computing device can return to block 606 and determine whether the remaining bounding box image(s) satisfy the scoring criteria.

If there are no more bounding box images in the set in block 610, then the edge computing device can perform block 612, in which the edge computing device can return the subset of best images of the guest. As described herein, the subset can include many at least one best image of the guest. The subset can include multiple images, in which each image satisfies different scoring criteria. For example, one image in the subset can satisfy scoring criteria for sharpness and/or lighting image features and a second image in the subset can satisfy scoring criteria for including one or more particular facial features of the guest. The subset can include images that satisfy one or more other scoring criteria.

In some implementations, the subset can include one image that satisfies all the scoring criteria. For example, the subset can include one image that has at least a threshold score value for each of the identified features in the image. In some implementations, the one image can be a composite image of one or more bounding box images having threshold score values. The composite image can be an image in which several bounding box images are stitched together to generate an image of the guest's entire face. For example, the edge computing device can stitch together an image that best represents the guest's forehead with images that best represent the guest's eyes, nose, cheeks, mouth, chin, neck, etc.

Moreover, as described throughout this disclosure, returning the subset of best images of the guest can include returning high resolution versions of at least one bounding box image in the subset. Returning the subset of best images can also include returning at least a portion of the low resolution digital image data corresponding to at least one image in the subset of best images. The high resolution versions of the image(s) in the subset and/or the low resolution image data can be transmitted to a computing device of a relevant stakeholder using less network bandwidth and compute resources than if all high resolution images and/or image data are transmitted. The relevant stakeholder can then use the transmitted data to make accurate, objective, and unbiased associations between the guest and activity in the retail environment. Refer to FIGS. 7A-C for additional discussion about associating the guest with activity in the retail environment.

Returning the subset of best images in block 612 can optionally include annotating the best images in the subset with metadata indicating the scoring criteria that was satisfied (block 614). For example, a bounding box image that satisfied scoring criteria for depicting the guest's eyes, nose, and mouth can be annotated with metadata indicating that the image depicts the guest's eyes, nose, and mouth. As another example, a bounding box image that satisfied scoring criteria for being a sharpest image of the guest's entire face and shoulders can be annotated with metadata indicating that the image is a best depiction of the guest's face. In some implementations, the best images can be annotated with metadata indicating which particular scoring criteria was applied and/or one or more score values that satisfied the scoring criteria. The best images can also be annotated with timestamps and other information that can be used by the relevant stakeholders to accurately and objectively associate the guest with activity in the retail environment. The annotations can be made automatically by the edge computing device. Sometimes, one or more of the metadata can be manually annotated by the relevant stakeholder in the retail environment.

Returning the subset of best images in block 612 can optionally include associating the guest with an event or other activity in the retail environment (block 616). The association(s) can be made automatically by the edge computing device as a system-based inference. The association(s) can also be made by the relevant stakeholder(s) in the retail environment. Refer to FIGS. 7A-C for further discussion about associating the guest with activity in the retail environment.

Returning the subset of best images in block 612 can optionally include transmitting the subset of best images to a computing device of the relevant stakeholder in the retail environment (block 618). As described in reference to FIGS. 7A-C, the subset of best images can then be used to objectively monitor the guest, associate the guest with suspicious activity, shortages, or other events in the retail environment. The subset of best images can also be used by the relevant stakeholder to take action to apprehend the guest or otherwise prevent the guest from engaging in such activity during a current shopping trip at the retail environment and/or during future/subsequent shopping trips at the retail environment.

The subset of best images can also be stored in a data store and/or associated with a guest profile. The subset of best images can be retrieved at a later time by the relevant stakeholder and used to objectively associate the guest with activity in the retail environment.

FIG. 7A is a conceptual diagram for associating a guest with an event in a retail environment using best images of the guest. The association(s) can be made by a system, such as the edge computing device 104 described herein. In some implementations, the association(s) can be made by relevant stakeholders in the retail environment, such as in-store employees and/or safety and security personnel. The best images of the guest, event data, and/or system-based inferences (or other seemingly disparate data) can be combined to objectively link the guest to various activity in the retail environment, including but not limited to shortages, ticket switching, miss-scans, security events, or other suspicious activity.

The event data can be generated from a variety of systems and/or devices already deployed in the retail environment. The event data can be generated by forward facing cameras at registers, POS terminals, or other checkout systems. The event data can also be generated by other cameras throughout the retail environment, location-based signaling devices, RFID readers, or other devices positioned in the retail environment. The event data can include transaction data, checkout data, scan data, location data, or other digital image data from within the retail environment. The event data can also include system-based inferences, such as a determination made by a checkout system that the guest likely scanned an improper barcode for an item during a checkout process. The event data can also include timestamps indicating when the events identified in the data occurred. As described herein, timestamps in the event data can be correlated to timestamps of the best images to determine an association (or likelihood of association) between the guest in the best images and the event of the event data.

Digital image data captured throughout the retail environment and/or in a checkout lane can be correlated with the best images of the guest to determine an association between the guest in the best images and events associated with the image data. For example, in some image data in an aisle, the guest can appear to be putting an item inside their clothes and during a checkout process, the item that was put inside the clothes may not be scanned. The best images of the guest can be compared to the image data in the aisle and/or other data received during the checkout process to determine whether the guest exiting the retail environment is the same as the guest who put the item inside their clothes and did not pay for it during the checkout process. Therefore, the best images of the guests can be used to objectively associate (with high confidence and/or accuracy) the guest with activities in the retail environment.

In some implementations, one or more image data generated by other cameras in the retail environment can also be processed using the disclosed techniques to generate and select best images of the guest. One or more other types of data and/or system-based inferences generated by devices/systems in the retail environment can also be correlated with the best images of the guests in order to accurately and objectively associate the guest with activity in the retail environment.

Still referring to FIG. 7A, the store 100 can include self-checkout systems 704A-N and at least one checkout lane 706. Some retail environments may only have self-checkout systems 704A-N. Some retail environments may only have checkout lanes 706. The self-checkout systems 704A-N can be used by guests to perform a checkout process without assistance of in-store employees. For example, a guest can scan items they wish to purchase using scanning devices at the self-checkout systems 704A-N. Once all the items are scanned, the guest can complete the checkout process by providing payment information to a POS terminal at the respective self-checkout system 704A-N. The guest can then exit the retail environment. The at least one checkout lane 706, on the other hand, can be worked by an in-store employee. The in-store employee can scan items the guest would like to purchase then prompt the guest for payment information to complete the checkout process once all the items have been scanned.

The self-checkout systems 704A-N and the at least one checkout lane 706 can have similar devices and/or systems. For example the systems 704A-N and the checkout lane 706 can have scanning devices (e.g., barcode scanners, handheld scanners, flatbed scanners, cameras), cameras (e.g., front-facing cameras, overhead cameras, flatbed cameras), display devices, conveyor belts, and/or POS terminals. The self-checkout systems 704A-N and the at least one checkout lane 706 can also have different devices and/or systems.

The store 100 may also include an exit area 702. The exit area 702 can be near or around one or more doors for entering and exiting the store 100. The exit area 702 can be a predetermined area in the store 100 before the doors. For example, the camera 102 can be positioned above or near a door to the store 100 with a field of view encompassing a threshold distance in front of the door. The exit area 702 can also include a predetermined area in front of the store 100 as well as inside the store 100. For example, as shown in FIG. 7A, the exit area 702 can include a portion of an exterior side of the store 100. The camera 102 can be positioned outside of the store 100 (e.g., attached to an exterior wall of the store 100) and can have a field of view that encompasses the predetermined area in front of the store 100 as well as a predetermined arear inside the store 100 before the door(s) used for entering and exiting the store 100. In FIG. 7A, the one camera 102 is positioned at or near the exit area 702. In some implementations, multiple cameras can be positioned in, around, or near the exit area 702. Digital image data from the multiple cameras can then be processed using the disclosed techniques to select best images of guests exiting the store 100.

In FIG. 7A, the camera 102 captures a continuous stream of image data of the exit area 702 of the store 100, as described herein. The image data can be received by the edge computing device 104 in block A. As shown in FIG. 1, the edge computing device 104 can be part of the camera 102. For example, the edge computing device 104 can be firmware installed on the camera 102. The edge computing device 104 can also be any other type of edge device that can be deployed in the store 100.

Here, the image data indicates that at time t1, the guest 106A is in the exit area 702 and walking towards the exit of the store 100. The image data also indicates that at time t4, the guest 106N is entering the exit area 702 and walking towards the exit of the store 100.

The edge computing device 104 can also receive event(s) data in block B. Block B can be performed before, during, or after block A. The event(s) data can be received from one or more devices/systems in the store 100. For example, the event(s) data can be transaction data that is received from a POS terminal at the checkout lane 706. The event(s) data can also be transaction data that is received from a POS terminal of at least one of the self-checkout systems 704A-N. As another example, the event(s) data can be image data captured by an overhead camera at one or more of the checkout lane 706 and/or self-checkout systems 704A-N. The event(s) data can also be other image data captured by one or more other cameras positioned throughout the store 100.

Here, the edge computing device 104 receives event data for Event A at time t0. The edge computing device 104 also receives event data for Event B at time t2. The event data can include more than just timestamps, as described throughout this disclosure. For example, the event data for either Events A or B can include objective identifiers associated with the guests (e.g., MAC address, phone number, credit card number, payment information, account information), items that were scanned during a checkout process, costs of the items that were scanned, a final payment made by the guest, timestamps, etc. Although the edge computing device 104 is shown as being separate from one or more other components described herein, the edge computing device 104 can be part of or otherwise integrated into any of the checkout systems described herein (e.g., the edge computing device 104 can be firmware or software installed on a POS terminal, a display screen, a cash register, a scanning device, or any other type of device that is part of a self-checkout system and/or a manual checkout lane system).

In block C, the edge computing device 104 can select best images of each of the guests appearing in the continuous stream of image data. Block C can be performed before, during, or after block B. Block C can be performed using the techniques described throughout this disclosure.

In block D, the edge computing device 104 can then associate the best image(s) of the guest with events based on timestamps of the best image(s) and timestamps of the event(s) data. Generating the guest-to-event associations can include generating confidence values indicating a likelihood that a particular guest is associated with a particular event.

A higher confidence value can indicate a higher likelihood that a guest is associated with an event (e.g., only one guest has a timestamp within a threshold amount of time as an event and images of the guest are also captured at the time of the event), such as a shortage or other security event/activity. A lower confidence value can indicate a lower likelihood that a guest is associated with an event (e.g., best images of two guests can have a same or similar timestamp and be within a same or similar threshold amount of time as at least one event in the store 100).

In block D, the edge computing device 104 can determine whether timestamps associated with the best image(s) of the guest 106A are within a threshold amount of time from timestamps associated with Event A and/or Event B. In FIG. 7A, the guest 106A may be associated with the Event A at the self-checkout system 704A. This is because a best image of the guest 106A can be captured at t1, which can be within a threshold amount of time from t0, when Event A was detected at the self-checkout system 704A. Moreover, this association can further be made based on comparing images captured of the self-checkout system 704A at t0 with the best image of the guest 106A at t1. If one or more features of the guest 106A are apparent in both images at times t0 and t1, the edge computing device 104 can have higher confidence that the guest 106A is associated with the Event A at the self-checkout system 704A.

Similarly, the edge computing device 104 can determine that timestamps associated with the best image(s) of the guest 106N are within a threshold amount of time from timestamps associated with Event B at the checkout lane 706. The best image of the guest 106N can be captured at t4, which can be within a threshold amount of time from t2, when Event B was detected at the checkout lane 706. This association can also be made based on analyzing one or more other event data associated with Event B, such as image data captured near the checkout lane 706.

The threshold amount of time used to compare the timestamps between the guests and Event A at the self-checkout system 704A and the guests and Event B at the checkout lane 706 can be different. The threshold amount of times used can be determined based on distances of the self-checkout systems 704A-N and the checkout lane 706 to the exit area 702 of the store 100. For example, the farther away a self-checkout system or checkout lane is to the exit area 702, the greater the threshold amount of time than if the self-checkout system or the checkout lane is physically closer to the exit area 702. In some implementations, the threshold amount of times used in block D can also vary and dynamically change based on a business of the store 100. For example, the busier the store 100, the more people moving around or near the exit area 702 and therefore the longer it may take a guest to approach the exit area 702 and exit the store 100. On the other hand, the less busy the store 100, the fewer people moving around and the less time it may take a guest to approach the exit area 702 and exit the store 100. The threshold amounts of time can also vary based on one or more other characteristics of the people/guests in the store 100 and/or the physical arrangement of the store 100.

The edge computing device 104 can return the guest-to-event associations in block E. The associations can be stored in a data store. The associations can be stored in a profile associated with the particular guest. The associations can also be transmitted to one or more computing devices of relevant stakeholders in the store 100. The relevant stakeholders can review the associations and determine whether such associations should be made. For example, the associations generated by the edge computing device 104 can be system-based inferences that guests in the store 100 are associated with particular events. The relevant stakeholders can then review these system-based inferences, and optionally other data from devices/systems in the store 100, to determine whether to make guest-to-event associations and what action(s) to take in response to these associations. The relevant stakeholders may also make one or more guest-to-event associations based on reviewing the comparing the event(s) data from block B with the image data from blocks A and/or C.

As shown in FIG. 7A, the edge computing device 104 can return a guest-to-event associations table 708. The table 708 can indicate which events in the store 100 are associated with (or likely associated with) which guests that were imaged in the exit area 702 by the camera 102. Although not depicted, the table 708 can also include confidence values indicating likelihood of such associations. In the example of FIG. 7A, images of the user 106A have been associated with Event A. This association may be made by the edge computing device 104 because the timestamps of the images (t1) and data of Event A (t0) are within a threshold amount of time of each other. Images of the user 106N have been associated with Event B because the timestamps of the images (t2) and data of Event B (t4) are within a threshold amount of time of each other.

Moreover, additional data can be used to make the associations between the user 106A and the Event A and user 106N and the Event B. For example, cameras positioned in the store 100 can capture the user 106A as they complete a self-checkout process at the self-checkout system 704A (where the Event A occurs) and move towards the exit area 702 with their purchased items. Digital image data from these cameras, and timestamps associated with this image data, can be compared to the image data generated by the camera 102 to link the user 106A at t1 to the Event A at t0. Similarly, as another example, RFID readers near the checkout lane 706 and the exit area 702 can detect RFID tags of items that are being purchased at the checkout lane 706 and items being carried out through the exit area 702. The RFID tags and timestamps associated with those readings can be correlated with transaction data from the checkout lane 706 and the image data from the camera 102 in the exit area 702 to link the user 106N at t4 with the Event B at t2. One or more other data and/or system-based inferences generated by devices and systems in the store 100 can be used to make guest-to-event associations.

FIGS. 7B-C is a flowchart of a process 710 for associating a guest with an event in a retail environment using best images of the guest, as illustrated in FIG. 7A. The process 710 can be performed to associate guests with particular types of events in the retail environment, such as shortages, safety events, and/or security events. In some implementations, the process 710 may also be used to associate the guest with any type of event in the retail environment, including but not limited to normal checkout processes and other normal or typical shopping experiences in the retail environment.

The process 710 corresponds to blocks A-E that are depicted and described in FIG. 7A. The process 710 can be performed by the edge computing device 104 in the retail environment. The process 710 can also be performed by one or more other computing systems, devices, computers, networks, cloud-based systems, and/or cloud-based services, such as a computing system that is remote from the retail environment. For illustrative purposes, the process 710 is described from the perspective of an edge computing device.

Referring to the process 710 in FIGS. 7B-C, the edge computing device can receive events data and corresponding timestamps for events occurring or having occurred (e.g., within a threshold period of time) in the retail environment (block 712). The events data can be received whenever an event is detected in the retail environment. For example, events data can be generated by a checkout system and transmitted to the edge computing device when the checkout system makes a system-based inference that a guest miss-scanned one or more items during a checkout process. The events data can also be received in real-time, regardless of whether a particular type of event (e.g., security event, ticket switching event, safety event), is detected, predicted, or otherwise occurs. For example, the events data can include transaction data for every transaction that is completed at a checkout system in the retail environment. Refer to block B in FIG. 7A for further discussion about receiving the events data.

The events data can include, but is not limited to, checkout data from one or more checkout systems in the retail environment (block 714), transaction data from one or more point of sale terminals in the retail environment (block 716), image data in the retail environment as captured by cameras positioned throughout the retail environment (block 718), and/or image data captured during checkout processes by one or more cameras in or near the checkout systems/checkout lanes (block 720).

The checkout data (block 714) can include data about items that have been scanned during a checkout process, including but not limited to item price data, quantity, item type, SKU, barcode, RFID tag, or other unique identifier. The checkout data can also include images of the guest during the checkout process and/or images or scans of the items to be purchased on a flatbed or around/near the checkout system/checkout lane. The checkout data also includes one or more timestamps associated with the checkout process.

The transaction data (block 716) can include information about items that have been scanned and purchased during the checkout process, including but not limited to item price, quantity, item type, SKU, barcode, RFID tag, or other unique identifier. The transaction data can also include guest information, such as the guest's account login information (e.g., email address, phone number, username), address, credit card information, mobile wallet information, or other payment information. The transaction data can include information about a location or other unique identifier for the checkout system or checkout lane where the checkout process is being completed. The transaction data can also include one or more timestamps associated with the checkout process.

The digital image data (block 718) in the retail environment and the digital image data (block 720) captured during checkout can include images and/or video feeds of one or more areas in the retail environment in which cameras are located. The image data, for example, can be captured by cameras in aisles, near shelves, in particular departments or locations of the retail environment, and/or near/around checkout systems and checkout lanes. The image data can include metadata, such as timestamps indicating times at which the image data is generated.

The edge computing device can also receive a continuous stream of image data of an exit area in the retail environment and timestamps corresponding to that image data (block 722). This image data can be received from a camera positioned in, near, or around the exit area. Block 722 can be performed before, during, or after any one or more of blocks 712-720. The continuous stream of image data can be received in real-time, whether or not guests are appearing in the image data. In some implementations, the continuous stream of image data can be received once a guest appears in the image data, which can reduce an amount of processing power and network bandwidth for transmitting the image data from the camera to the edge computing device. Refer to block A in FIG. 7A for further discussion about receiving the image data from the camera.

In block 724, the edge computing device can select at least one best image of a guest appearing in the continuous stream of image data. Refer to the process 300 in FIGS. 3A-B and block C in FIG. 7A for further discussion.

In block 726, the edge computing device can retrieve guest-to-event association heuristics from a data store. The heuristics can indicate one or more rules/conditions that can be satisfied in order to make an association between a guest and an event in the retail environment. For example, the heuristics can indicate a threshold amount of time by which an event can be associated with a guest in the exit area of the retail environment. The threshold amount of time can indicate a maximum amount of time that can pass between a timestamp associated with an event that occurred at a particular location in the retail environment and a timestamp of one or more best images of the guest in an exit area of the retail environment. If the timestamp of the best image(s) is within the threshold amount of time of the event timestamp, the guest can likely be associated with the event.

The threshold amount of time can vary depending on the size of the retail environment and/or relative distance between the particular location of the event and the exit area. For example, if a ticket switching event is detected in an electronics department located closer to a back end of the retail environment, a guest would have a long distance to walk to the exit area and thus the threshold amount of time can be long. As another example, if a ticket switching event is detected at a self-checkout lane and the self-checkout lane is closer to the exit area than a manual checkout lane, the threshold amount of time can be shorter for the self-checkout lane than the manual checkout lane. In some implementations, the threshold amount of time can also vary depending on real-time traffic in the retail environment. For example, if the event occurs during typically busy business hours (e.g., rush hour after work, weekend days, some weeknights), the threshold amount of time can be longer than less busy business hours to account for more time needed by the guests to complete their checkout processes and/or exit the retail environment.

The heuristics can also indicate one or more additional or alternative rules/conditions to be satisfied in order to associate a guest with an event in the retail environment. For example, the heuristics can include correlating digital image data captured during a checkout process with the best image(s) of the guest. The image data captured during the checkout process can be analyzed, by the edge computing device and using the techniques described throughout this disclosure (e.g., object detection techniques), to extract guest features. The extracted guest features can be compared, by the edge computing device, to the guest features identified in/by the best image(s). If the extracted features match the best image(s) features (or are similar within a threshold confidence level), then the edge computing device can generate an association between the guest in the best image(s) and a checkout event that occurs when the guest is imaged during the checkout process.

Using the guest-to-event association heuristics, the edge computing device can associate the best image(s) of the guest with events identified in the events data (block 728). Refer to block D in FIG. 7A for further discussion. As described throughout this disclosure, the edge computing device can associate the timestamp(s) of the best image(s) with the timestamp(s) of the event(s) identified in the events data (block 730). For example, if the best image(s) of the guest have the timestamp(s) within a threshold amount of time of the timestamp(s) of the events data, the guest can be associated with the event(s) identified in the events data. Sometimes, the guest can be associated with the event if the best image(s) has the timestamp(s) within a range of time after the timestamp(s) of the events data. For example, if the event occurs at a checkout lane during a checkout process at t0 and the checkout lane is furthest from an exit area where the best image(s) are captured, the guest cannot realistically be in the exit area at t1, immediately after completing the checkout process. Rather, the guest may not arrive in the exit area until at least t4, for example. Therefore, if the best image(s) of the guest has the timestamp(s) between t4 and another threshold time (e.g., t8), then the guest may be associated with the particular event that occurred at the checkout lane at t0.

The edge computing device can additionally or alternatively identify a pathway of the guest through the retail environment based on the best image(s) and the event data (block 732). The edge computing device can correlate, for example, one or more different, seemingly disparate data sources to identify the pathway of the guest. The edge computing device can receive digital image data of various locations in the retail environment, including but aisles, departments, and checkout areas. The edge computing device can use object detection techniques to isolate guest features in the image data, then match those features across the image data. If the features match across the image data, the edge computing device can link together the image data to generate the pathway of the guest throughout the retail environment. The edge computing device can also use timestamps associated with the image data to link the image data and generate the pathway of the guest. The edge computing device may also isolate/determine the pathway of the guest using other data and/or system-based inferences generated by devices and/or systems in the retail environment. For example, location-based data, RFID readings, etc. can be used by the edge computing device to determine the guest's pathway and link the pathway to the best image(s) of the guest.

The edge computing device can additionally or alternatively determine/isolate similar features of the guest across the best image(s) and the events data to generate the association(s) (block 734). As described above, the edge computing device can determine features of the guest, such as facial features, posture, hair, clothing, movement, etc. The edge computing device can determine whether the events data includes one or more of those features, or similar features within a threshold confidence level. If the features are apparent in the events data (or satisfy the threshold confidence level), then the edge computing device can associate the guest with the event.

The edge computing device may optionally generate at least one confidence value indicating that the guest is associated with the event(s) in the retail environment (block 736). The confidence value can indicate a likelihood that the guest appearing in the best image(s) is associated with the event(s) identified by the events data. The higher the confidence value, the greater certainty that the guest is associated with the event(s). The confidence value can be a numeric value, integer, or float value. The confidence value can be assigned on a numeric scale, for example in a range between 0 to 1, 0 to 5, 0 to 10, 0 to 100, 1 to 5, 1 to 10, 1 to 100, etc. One or more other scales can be used to assign the confidence value. In some implementations, the confidence value can be a Boolean or string value (e.g., Yes/No, True/False, High Confidence/Low Confidence).

In block 738, the edge computing device can return the guest-to-event association(s). The edge computing device can return any of the associations that were made in block 728. The edge computing device can return a subset of the associations that were made in block 728. For example, the edge computing device may return the associations that satisfy threshold criteria, such as a threshold confidence value. If an association has a confidence value that is greater than the threshold confidence value, then the association can be returned. The edge computing device may return only the associations that correspond to particular types of activity in the retail environment. For example, the edge computing device may only return associations for security events, safety events, or other suspicious activity events in the retail environment. Refer to block E in FIG. 7A for further discussion about returning the associations generated by the edge computing device.

As part of returning the association(s), the edge computing device can optionally store a high resolution version of the best image(s), timestamp(s) associated with the best image(s), associated event data, confidence value, and/or an objective identifier for the guest (block 740). Any of this stored information can then be retrieved by a computing device of a relevant stakeholder and used to objectively associate the guest with a safety, security, or other suspicious activity event that warrants action to be taken. Moreover, the objective identifiers for the guest can be part of the checkout data (block 714), the transaction data (block 716), the image data (blocks 718 and/or 720), or any other types of user data associated with/corresponding to the guest.

As part of returning the association(s), the edge computing device can optionally transmit the best image(s) and associated event data to a computing device of a relevant stakeholder (block 742). One or more other relevant data, such as the objective identifier(s), can be transmitted to the computing device to be used by the stakeholder to determine whether to take some action against the guest. The stakeholder can, for example, decide, based on reviewing the association(s), to apprehend the guest and prevent them from completing a checkout process or leaving the retail environment until their bags are checked. The stakeholder can perform one or more other actions in order to prevent the guest from completing activity associated with the event and/or to deter/prevent the guest from performing similar activity in the future.

Figure 8:
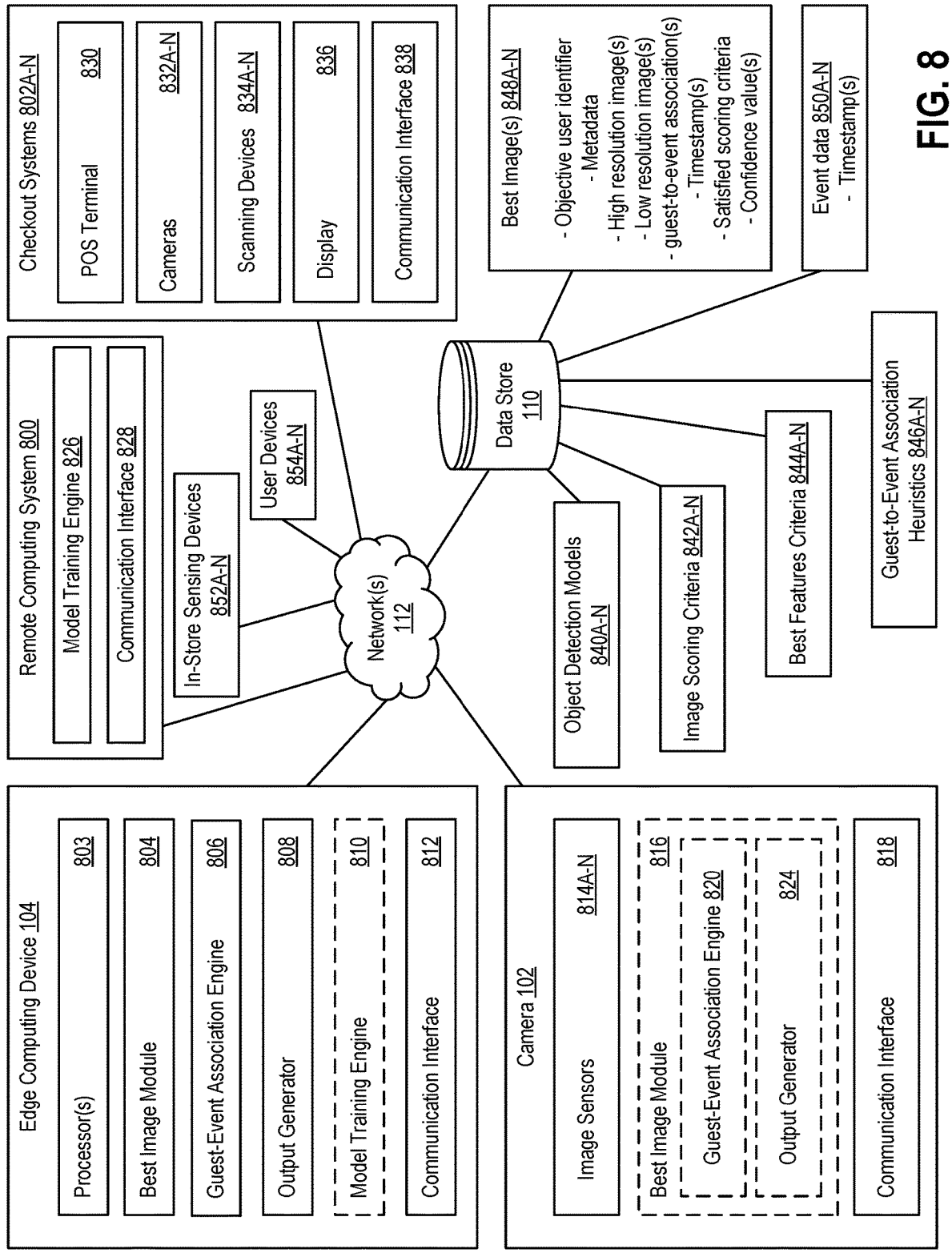
FIG. 8 is a system diagram of components that can be used to perform the disclosed techniques.

FIG. 8 is a system diagram of components that can be used to perform the disclosed techniques. The camera 102, edge computing device 104, data store 110, a remote computing system 800, checkout systems 802A-N, in-store sensing devices 852A-N, and user devices 854A-N can communicate (e.g., wired and/or wireless) via the network(s) 112.

The camera 102 can be any type of imaging device positioned in, around, and/or near an exit area of a retail environment. As described herein, the camera 102 can be configured to capture digital image data of the exit area. The image data can be a continuous stream of image data, such as a video feed. The camera 102 can be a surveillance camera, CCTV camera, or other type of video camera. In some implementations, the exit area can include more than one camera 102. For example, a first camera can be positioned inside the retail environment with a field of view of the exit area inside the retail environment. A second camera can be positioned outside the retail environment with a field of view of an exit area outside the retail environment. One or more other cameras and/or camera configurations can be used with the disclosed techniques.

The camera 102 can include image sensors 814A-N, an optional best image module 816, and a communication interface 818. The image sensors 814A-N can be any type of sensor configured to capture image data, as described throughout this disclosure. The best image module 816 can be the same as best image module 804, described further below. The best image module 816 can be firmware or software installed on the camera 102.

The best image module 816 can be configured to use the disclosed techniques to process the image data generated by the image sensors 814A-N and select best images of guests appearing in the image data. The best image module 816 can retrieve one or more object detection models 840A-N from the data store 110 to be used in identifying features in the image data from the image sensors 814A-N. Once the features are identified, the best image module 816 can retrieve and use image scoring criteria 842A-N from the data store 110 to generate scores (or confidence values) for each of the identified features across the image data. The best image module 816 can also retrieve best features criteria 844A-N from the data store 110 to assess the generated scores and determine which images corresponding to those scores are best images of a particular guest.

The best images of the guest can be stored in the data store 110 as best images 848A-N. The best images 848A-N can include information such as objective user identifiers, metadata (e.g., information indicating which scoring criteria are satisfied by the respective best image(s)), one or more high resolution images of the guest, one or more low resolution images of the guest, guest-to-event association(s), timestamp(s), satisfied scoring criteria information, and/or confidence value(s). One or more additional or fewer information may be stored with the best images 848A-N. The best images 848A-N may also be retrieved from the data store 110 at a later time by one or more of the user devices 854A-N. Refer to the process 300 in FIGS. 3A-B, the process 400 in FIGS. 4A-B, the process 500 in FIG. 5, and the process 600 in FIG. 6 for further discussion about determining the best images of a guest. As described herein, the best image module 816 can perform the disclosed techniques on the edge, using less processing power and network bandwidth than performing the disclosed techniques at a remote computing system.

The best image module 816 can also optionally include a guest-event association engine 820 and/or an output generator 824. The engine 820 and the generator 824 can be the same as or similar to engine 806 and generator 808 described further below. The guest-event association engine 820 can be configured to generate associations between guests and events using the best images of the guest and events data. The engine 820 can retrieve event data 850A-N from the data store 110. In some implementations, the engine 820 can receive the event data 850A-N directly from one or more devices and/or systems in the retail environment (e.g., a checkout system 802A-N, one or more in-store sensing devices 852A-N). The engine 820 can compare the event data 850A-N with the best images 848A-N in order to generate the guest-to-event associations. For example, the engine 820 can compare timestamps in the event data 850A-N with timestamps in the best images 848A-N, as described throughout this disclosure. If the timestamps of the best images 848A-N are within a threshold amount of time from the timestamps of the event data 850A-N, the engine 820 can associate the guest in the best images 848A-N with the event data 850A-N. The engine 820 can retrieve guest-to-event association heuristics 846A-N from the data store 110, to be used in generating the guest-to-event associations. The generated associations can be stored in the data store 110 in association with the particular guest (e.g., via the objective user identifier), the particular event, and/or the best images 848A-N of the guest. Refer to the FIGS. 7A-C for further discussion about generating guest-to-event associations.

The output generator 824 can be configured to generate output indicating one or more best images associated with the guest and/or one or more guest-to-event associations. The output generator 824 can transmit the generated output to one or more of the user devices 854A-N, described further below. The generator 824 can also store the output in the data store 110, which can be retrieved at one or more later times by one or more of the user devices 854A-N.

The edge computing device 104 can be any type of computing system that can be deployed on the edge. For example, the edge computing device 104 can be firmware installed on the camera 102. The edge computing device 104 can be installed on any camera in any retail environment and used to perform the techniques described herein. The edge computing device 104 can be part of the camera 102, in some implementations. The edge computing device 104 can also be separate from the camera 102. The edge computing device 104 can be computationally efficient, use low processing power, and reduce network bandwidth by processing the image data generated by the image sensors 814A-N on the edge in order to select best images of guests in the retail environment. The edge computing device 104 can therefore perform the techniques described throughout this disclosure.

The edge computing device 104 can include processor(s) 803, best image module 804, guest-event association engine 806, output generator 808, and communication interface 812. The edge computing device 104 can optionally include a model training engine 810. The processor(s) 803 can be configured to perform the disclosed techniques using low processing power, low CPU cycles, and less network bandwidth, as described herein. The best image module 804 can be the same as or similar to the best image module 826 described above. The guest-event association engine 806 can be the same as or similar to the engine 820 described above. The output generator 808 can be the same as or similar to the generator 824 described above.

The optional model training engine 810 can be configured to train any of the object detection models 840A-N described herein that are used to detect guest features in image data, score the features, and select best images of a guest based on the feature scores. The engine 810 can perform the training techniques described in reference to FIG. 2.

The data store 110 can be any type of storage system, cloud-based storage, and/or database. The data store 110 can store any of the information described herein, including but not limited to the object detection models 840A-N, the image scoring criteria 842A-N, the best features criteria 844A-N, the guest-to-event association heuristics 846A-N, the best images 848A-N, and/or the event data 850A-N.

The remote computing system 800 can be any type of computing system, network of devices, cloud-based system, and/or device that is remote from the retail environment. The remote computing system 800 can be configured to generate and train one or more of the object detection models 840A-N. In some implementations, the remote computing system 800 can perform one or more of the techniques described herein. As an illustrative example, the edge computing device 104 can be configured to select the best images of a guest and the remote computing system 800 can be configured to generate guest-to-event associations using the best images of the guest. In some implementations, the edge computing device 104 can perform some of the disclosed techniques in real-time or near real-time (e.g., selecting the best images of the guest) and the remote computing system 800 can perform other disclosed techniques at other, later times (e.g., generating guest-to-event associations), which can save computational resources, reduce real-time network bandwidth, and optimize processing efficiency.

The remote computing system 800 can include a model training engine 826 and a communication interface 828. The model training engine 826 can be the same as or similar to the optional model training engine 810 described above. Accordingly, the model training engine 826 can be configured to perform the techniques described in FIG. 2 to generate and train one or more of the object detection models 840A-N.

The checkout systems 802A-N can be positioned throughout a checkout area in the retail environment. The checkout systems 802A-N can include self-checkout systems and/or manual checkout lanes. Refer to the self-checkout systems 704A-N and the checkout lane 706 in FIG. 7A for further discussion. The checkout systems 802A-N can include one or more components configured to be used in performing and completing a checkout process. For example, the checkout systems 802A-N can each include a POS terminal 830, one or more cameras 832A-N, one or more scanning devices 834A-N, a display 836, and a communication interface 838.

The POS terminal 830 can be configured to receive/scan item information and/or generate transaction data for a checkout process. The POS terminal 830 can be any type of device and/or system to receive payment information from a guest when completing a transaction during the checkout process. Once the checkout process is completed, the POS terminal 830 can generate transaction data. The transaction data, as described herein, can be part of events data and used by the guest-event association engine 820 and/or 806 to generate guest-to-event associations.

The cameras 832A-N can be any type of image sensors that are part of the checkout systems 802A-N and/or near/around the checkout systems 802A-N. For example, the cameras 832A-N can include an overhead camera or image sensor configured to capture image data of a flatbed area or other scanning area in a checkout lane. The cameras 832A-N can include an image sensor embedded in the display 836 and/or a front-facing camera configured to capture image data of a guest as they complete a self-checkout process at the respective checkout systems 802A-N. The cameras 832A-N can capture image data that can be used by the edge computing device 104, the remote computing system 800, the checkout systems 802A-N, or any other computing system to generate system-based inferences about whether the guest is engaging in suspicious activity during the checkout process (e.g., scanning some items but not others, ticket switching, sweethearting). The image data captured by the cameras 832A-N can also be used by the guest-event association engine 806 and/or 820 to correlate best images of a guest with event data in the retail environment.

The scanning devices 834A-N can be any type of device used to scan item identifiers during a checkout process. The scanning devices 834A-N can include, but are not limited to, handheld scanners, barcode scanners, RFID tag readers, weight scales, imaging devices, image sensors, and/or flatbed scanners. The scanning devices 834A-N can be used by the guest or an in-store employee to scan one or more items for purchase during the checkout process. Information about the items that have been scanned can be used to generate transaction data, other checkout data, and/or events data. Such data can be used by the guest-event association engine 806 and/or 820 to generate guest-to-event associations, as described herein.

The display 836 can be any type of output device, including but not limited to a touch screen, other types of screens, and/or microphones. The display 836 can be configured to present information about a checkout process, such as real-time transaction data (e.g., quantity and price of items as they are scanned, total price for a current shopping trip, payment information, user account information). The display 836 can also be an input device, such as a touch screen, keyboard, microphone, etc., and can be configured to receive user input during the checkout process. For example, the display 836 can receive manual entry of one or more items to be purchased by the guest. The display 836 can receive input such as personalized promotions, offers, discounts, user account information, payment information, or other updates to be made to a current checkout process. Information provided as input to the display 836 can also be used by the guest-event association engine 806 and/or 820 to generate the guest-to-event associations.

The in-store sensing devices 852A-N can be any type of device and/or system installed in the retail environment that may generate data. For example, the in-store sensing devices 852A-N can include cameras (e.g., CCTV cameras, surveillance cameras) installed in aisles, around shelves, and/or in departments in the retail environment. The in-store sensing devices 852A-N can include location-based signaling devices installed throughout the retail environment. The in-store sensing devices 852A-N may include RFID readers or other types of item identifier reading/scanning devices. The in-store sensing devices 852A-N can generate data and/or system-based inferences that may be used by any of the components described herein to select best images of a guest and/or generate guest-to-event associations.

The user devices 854A-N can be any type of computing devices uses by relevant stakeholders in the retail environment. The user devices 854A-N can be mobile computing devices, including but not limited to mobile phones, smart phones, tablets, wearable devices, laptops, and/or computers. The relevant stakeholders can include, but are not limited to, in-store employees and/or safety and security personnel. The user devices 854A-N can receive (or retrieve) best images 848A-N of guests from the best image modules 804 and/or 816 and present the best images in a graphical user interface (GUI) display of the user devices 854A-N. The relevant stakeholders can view the best images and use the best images to make determinations about whether the guests appearing in the best images are associated with particular types of activities in the retail environment (e.g., security events, safety, events, or other suspicious activities). The relevant stakeholders can also use the best images to objectively perform one or more actions in association with the guest(s) (e.g., monitor the guest(s), apprehend the guest(s), add the guest(s) to a watch list). The user devices 854A-N can also receive (or retrieve) the event data 850A-N. The relevant stakeholders can review the event data 850A-N and the best images 848A-N to generate guest-to-event associations. The user devices 854A-N may also receive (or retrieve) guest-to-event associations that were system-generated using the disclosed techniques. The relevant stakeholders can then analyze the guest-to-event associations to determine one or more actions to be taken with regards to the guests that are associated with events in the retail environment.

Finally, the communication interfaces 812, 818, 828, and 838 can be configured to provide communication between and amongst the devices, systems, and components described in FIG. 8.

Figure 9:
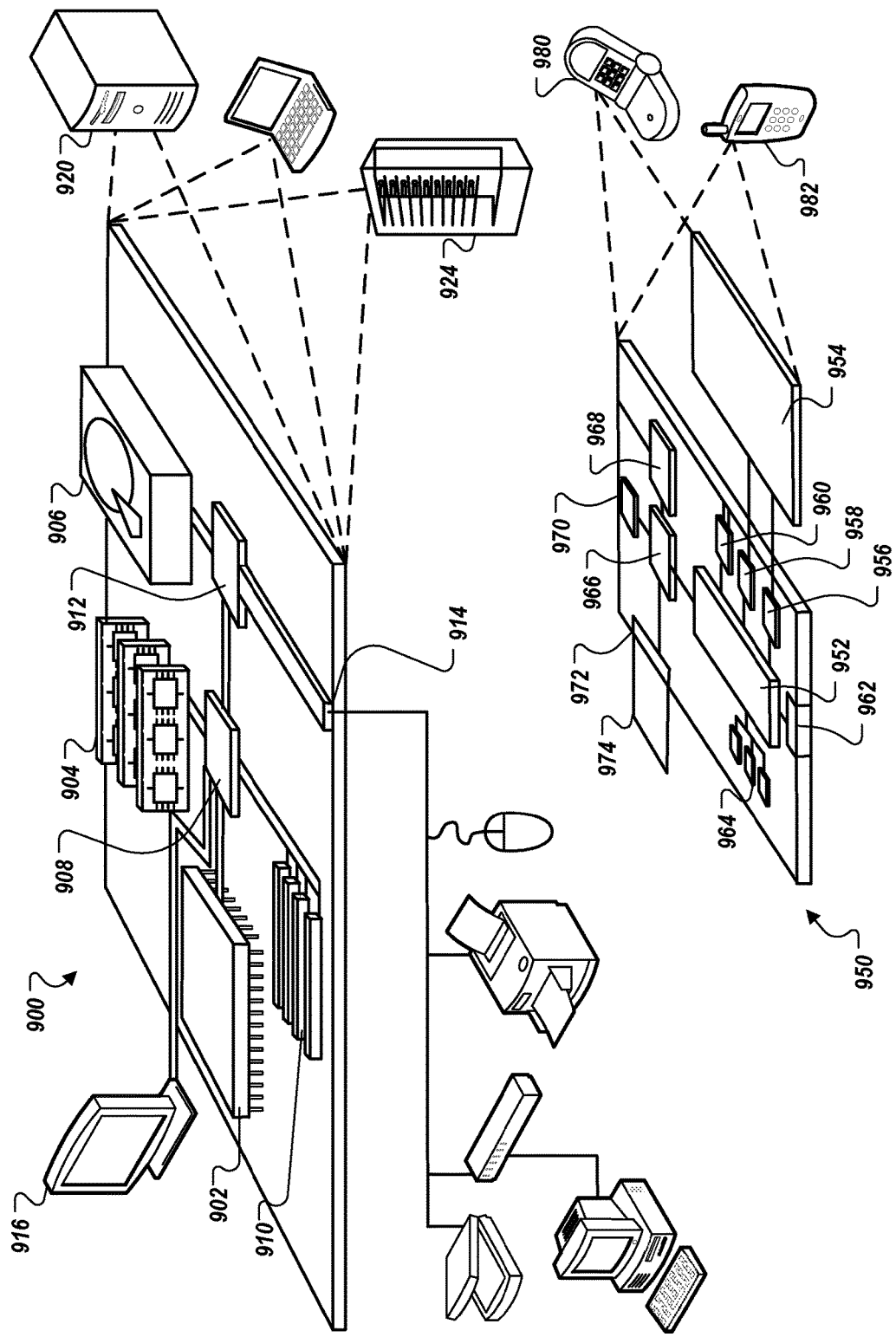
FIG. 9 is a schematic diagram that shows an example of a computing device and a mobile computing device.

FIG. 9 shows an example of a computing device 900 and an example of a mobile computing device that can be used to implement the techniques described here. The computing device 900 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and can be mounted on a common motherboard or in other manners as appropriate. The processor 902 can process instructions for execution within the computing device 900, including instructions stored in the memory 904 or on the storage device 906 to display graphical information for a GUI on an external input/output device, such as a display 916 coupled to the high-speed interface 908. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 904 stores information within the computing device 900. In some implementations, the memory 904 is a volatile memory unit or units. In some implementations, the memory 904 is a non-volatile memory unit or units. The memory 904 can also be another form of computer-readable medium, such as a magnetic or optical disk.

The storage device 906 is capable of providing mass storage for the computing device 900. In some implementations, the storage device 906 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 904, the storage device 906, or memory on the processor 902.

The high-speed interface 908 manages bandwidth-intensive operations for the computing device 900, while the low-speed interface 912 manages lower bandwidth-intensive operations. Such allocation of functions is exemplary only. In some implementations, the high-speed interface 908 is coupled to the memory 904, the display 916 (e.g., through a graphics processor or accelerator), and to the high-speed expansion ports 910, which can accept various expansion cards (not shown). In the implementation, the low-speed interface 912 is coupled to the storage device 906 and the low-speed expansion port 914. The low-speed expansion port 914, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 900 can be implemented in a number of different forms, as shown in the figure. For example, it can be implemented as a standard server 920, or multiple times in a group of such servers. In addition, it can be implemented in a personal computer such as a laptop computer 922. It can also be implemented as part of a rack server system 924. Alternatively, components from the computing device 900 can be combined with other components in a mobile device (not shown), such as a mobile computing device 950. Each of such devices can contain one or more of the computing device 900 and the mobile computing device 950, and an entire system can be made up of multiple computing devices communicating with each other.

The mobile computing device 950 includes a processor 952, a memory 964, an input/output device such as a display 954, a communication interface 966, and a transceiver 968, among other components. The mobile computing device 950 can also be provided with a storage device, such as a micro-drive or other device, to provide additional storage. Each of the processor 952, the memory 964, the display 954, the communication interface 966, and the transceiver 968, are interconnected using various buses, and several of the components can be mounted on a common motherboard or in other manners as appropriate.

The processor 952 can execute instructions within the mobile computing device 950, including instructions stored in the memory 964. The processor 952 can be implemented as a chipset of chips that include separate and multiple analog and digital processors. The processor 952 can provide, for example, for coordination of the other components of the mobile computing device 950, such as control of user interfaces, applications run by the mobile computing device 950, and wireless communication by the mobile computing device 950.

The processor 952 can communicate with a user through a control interface 958 and a display interface 956 coupled to the display 954. The display 954 can be, for example, a TFT (Thin-Film-Transistor Liquid Crystal Display) display or an OLED (Organic Light Emitting Diode) display, or other appropriate display technology. The display interface 956 can comprise appropriate circuitry for driving the display 954 to present graphical and other information to a user. The control interface 958 can receive commands from a user and convert them for submission to the processor 952. In addition, an external interface 962 can provide communication with the processor 952, so as to enable near area communication of the mobile computing device 950 with other devices. The external interface 962 can provide, for example, for wired communication in some implementations, or for wireless communication in other implementations, and multiple interfaces can also be used.

The memory 964 stores information within the mobile computing device 950. The memory 964 can be implemented as one or more of a computer-readable medium or media, a volatile memory unit or units, or a non-volatile memory unit or units. An expansion memory 974 can also be provided and connected to the mobile computing device 950 through an expansion interface 972, which can include, for example, a SIMM (Single In Line Memory Module) card interface. The expansion memory 974 can provide extra storage space for the mobile computing device 950, or can also store applications or other information for the mobile computing device 950. Specifically, the expansion memory 974 can include instructions to carry out or supplement the processes described above, and can include secure information also. Thus, for example, the expansion memory 974 can be provide as a security module for the mobile computing device 950, and can be programmed with instructions that permit secure use of the mobile computing device 950. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 964, the expansion memory 974, or memory on the processor 952. In some implementations, the computer program product can be received in a propagated signal, for example, over the transceiver 968 or the external interface 962.

The mobile computing device 950 can communicate wirelessly through the communication interface 966, which can include digital signal processing circuitry where necessary. The communication interface 966 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 968 using a radio-frequency. In addition, short-range communication can occur, such as using a Bluetooth, WiFi, or other such transceiver (not shown). In addition, a GPS (Global Positioning System) receiver module 970 can provide additional navigation- and location-related wireless data to the mobile computing device 950, which can be used as appropriate by applications running on the mobile computing device 950.

The mobile computing device 950 can also communicate audibly using an audio codec 960, which can receive spoken information from a user and convert it to usable digital information. The audio codec 960 can likewise generate audible sound for a user, such as through a speaker, e.g., in a handset of the mobile computing device 950. Such sound can include sound from voice telephone calls, can include recorded sound (e.g., voice messages, music files, etc.) and can also include sound generated by applications operating on the mobile computing device 950.

The mobile computing device 950 can be implemented in a number of different forms, as shown in the figure. For example, it can be implemented as a cellular telephone 980. It can also be implemented as part of a smart-phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for generating best images of a person in a retail environment, the system comprising:
    a camera positioned within a retail environment, the camera comprising at least one image sensor that is configured to generate a continuous stream of image data of the retail environment; and
    an edge computing device in communication with the camera, the edge computing device comprising one or more processors and memory storing instructions that, when executed by the one or more processors, cause the one or more processors to perform operations comprising:
        receiving, from the camera, the continuous stream of image data;
        detecting, using object detection techniques, a person in the continuous stream of image data, wherein the continuous stream of image data comprises a plurality of images that are part of a time series;
        generating bounding boxes for each of the plurality of images around the person based on detecting the person as the person moves in the continuous stream of image data;
        identifying, based on applying a features model to each of the bounding boxes, at least one feature of the plurality of images depicting the person, the features model having been trained to identify and score features in training image data, the training image data comprising at least one of facial features of a person or quality features of the training image data;
        selecting a subset of the bounding boxes having the at least one feature that satisfies best images criteria, wherein the subset of the bounding box images are best images of the person, wherein selecting the subset of the bounding boxes comprises:
            aggregating, for each of the bounding boxes, scores for the at least one feature identified in the bounding box to generate an aggregate feature score,
            determining whether the aggregate feature score satisfies a threshold score value, and
            adding the bounding box to the subset based on a determination that the aggregate feature score satisfies the threshold score value; and
        returning the best images of the person.

2. The system of claim 1, wherein the edge computing device is comprises firmware installed on the camera.

3. The system of claim 1, wherein the operations further comprise:
    caching and down-sampling the continuous stream of image data, wherein the cached image data comprises a high resolution version of at least a portion of the continuous stream of image data; and
    detecting the person in the down-sampled continuous stream of image data.

4. The system of claim 3, wherein in response to selecting the subset of the bounding boxes having at least one of the at least one features that satisfies the best images criteria, the operations further comprise:
    retrieving a portion of the cached image data that corresponds to at least one of the best images of the person; and
    returning the retrieved portion of the cached image data to be presented in a graphical user interface (GUI) display at a computing device of a relevant stakeholder of the retail environment, the relevant stakeholder being at least one of an in-store employee, safety and security personnel, and law enforcement.

5. The system of claim 1, wherein the operations further comprise detecting the person in the continuous stream of image data using an object detection model that was trained to (i) identify, using object detection techniques, features of the person in training image data, and (ii) score the identified features of the person using scoring criteria.

6. The system of claim 1, wherein detecting the person in the continuous stream of image data comprises:
    generating a bounding box around the person in a first image of the plurality of images in the continuous stream of image data; and
    tracking the bounding box across subsequent images in the plurality of images in the continuous stream of image data in a process comprising:
        generating a first bounding box around the person at a first time in the first image of the plurality of images,
        generating a second bounding box around the person at a second time in a second image of the plurality of images,
        determining a change in pixel values between the first bounding box and the second bounding box,
        determining a velocity of the person based on the change in pixel values, wherein the velocity indicates a change in movement and directionality of the person between the first image and the second image in the plurality of images,
        projecting a location of the person in a third image of the plurality of images at a third time based on the determined velocity of the person, and
        generating a third bounding box around the person at the third time in the third image at the projected location of the person.

7. The system of claim 1, wherein detecting the person in the continuous stream of image data comprises applying a model to the continuous stream of image data, the model having been trained to (i) determine a velocity of the person across the plurality of images in the continuous stream of image data and (ii) project movement of the person across the plurality of images in the continuous stream of image data based on the determined velocity.

8. The system of claim 1, wherein the at least one feature of the plurality of images depicting the person includes at least one of: a forehead, eyes, a nose, a mouth, a chin, cheeks, a face, posture, hair, clothing, accessories, or movement of the person.

9. The system of claim 1, wherein the at least one feature of the plurality of images depicting the person includes at least one of: lighting, clarity, sharpness, shadows, angle, or camera viewpoint.

10. The system of claim 1, wherein selecting a subset of the bounding boxes having at least one of the at least one feature that satisfies best images criteria comprises selecting at least one of the bounding boxes having at least one feature score corresponding to the at least one feature that satisfies a threshold feature score value.

11. The system of claim 1, wherein returning the best images of the person comprises transmitting, for presentation in a GUI display of a computing device of a relevant stakeholder of the retail environment, (i) a high resolution version of a best image of the person and (ii) a low resolution version of a portion of the continuous stream of image data that corresponds to one or more of the best images of the person.

12. The system of claim 1, wherein returning the best images of the person comprises annotating the best images with information indicating the best images criteria that was satisfied, the information including an indication of a type of feature identified in each of the best images and a feature score corresponding to the identified feature in each of the best images.

13. The system of claim 1, wherein the operations further comprise associating the person in the best images with an event in the retail environment, the event being at least one of a safety event or a security event,
wherein associating the person in the best images with an event in the retail environment comprises:
receiving event data from a sensing device in the retail environment, the event data including a timestamp associated with the event and at least one of (i) transaction data generated by a point of sale (POS) terminal during a checkout process, (ii) checkout data generated by a checkout system during a checkout process, or (iii) image data generated by at least one camera in the retail environment,
determining whether the timestamp associated with the best images of the person is within a threshold amount of time of the timestamp associated with the event, and
associating, based on a determination that the time stamp associated with the best images of the person is within the threshold amount of time of the timestamp associated with the event, the person in the best images with the event.

14. The system of claim 13, wherein associating the person in the best images with the event comprises identifying a pathway of the person through the retail environment based on correlating the best images of the person with the event data.

15. The system of claim 1, wherein selecting a subset of the bounding boxes having at least one of the at least one features that satisfies best images criteria comprises:
retrieving, for each of the identified features in each of the bounding boxes, a respective threshold score value;
determining whether a score of the identified feature satisfies the respective threshold score value;
generating a count indicating a quantity of the identified features that satisfy the respective threshold score values;
determining whether the count exceeds a threshold features count; and
adding the bounding box to the subset based on a determination that the count exceeds the threshold features count.

16. The system of claim 1, further comprising:
a checkout system in communication with the edge computing device,
wherein the checkout system is configured to generate event data during a checkout process at the checkout system and transmit the event data to the edge computing device,
wherein the operations further comprise associating the person in the best images with an event corresponding to the event data, and
wherein the checkout system comprises the edge computing device.

17. The system of claim 1, wherein the camera includes a housing and the edge computing device is physically contained within the housing.

18. The system of claim 1, wherein the camera is positioned near at least one of (i) an exit area of the retail environment and (ii) a checkout area of the retail environment.

19. A method for generating best images of a person in a retail environment, the method comprising:
receiving, by an edge computing device and from a camera, a continuous stream of image data of a retail environment;
detecting, by the edge computing device and using object detection techniques, a person in the continuous stream of image data, wherein the continuous stream of image data comprises a plurality of images that are part of a time series;
generating, by the edge computing device, bounding boxes for each of the plurality of images around the person based on detecting the person as the person moves in the continuous stream of image data;
identifying, by the edge computing device and based on applying a features model to each of the bounding boxes, at least one feature of the plurality of images depicting the person, the features model having been trained to identify and score features in training image data, the training image data comprising at least one of facial features of a person or quality features of the training image data;
selecting, by the edge computing device, a subset of the bounding boxes having the at least one feature that satisfies best images criteria, wherein the subset of the bounding box images are best images of the person, wherein selecting the subset of the bounding boxes comprises:
retrieving, for each of the identified features in each of the bounding boxes, a respective threshold score value,
determining whether a score of the identified feature satisfies the respective threshold score value,
generating a count indicating a quantity of the identified features that satisfy the respective threshold score values, and
adding the bounding box to the subset based on a determination that the count exceeds a threshold features count; and
returning, by the edge computing device, the best images of the person.

20. The method of claim 19, further comprising:
detecting, by the edge computing device, the person in the continuous stream of image data using an object detection model that was trained to (i) identify, using object detection techniques, features of the person in training image data, and (ii) score the identified features of the person using scoring criteria.

* * * * *